United States Patent
Neill et al.

(10) Patent No.: US 12,292,399 B2
(45) Date of Patent: May 6, 2025

(54) HIGHLY SELECTIVE CHROMATOGRAPHY-MOLECULAR ROTATIONAL RESONANCE SPECTROSCOPY SYSTEMS AND METHODS

(71) Applicant: BrightSpec, Inc., Charlottesville, VA (US)

(72) Inventors: Justin L. Neill, Charlottesville, VA (US); Matt Muckle, Earlysville, VA (US); Alexander V. Mikhonin, Charlottesville, VA (US); Walter H. Colsman, Weston, MA (US); Daniel W. Armstrong, Arlington, TX (US)

(73) Assignee: BrightSpec, Inc., Charlottesville, VA (US)

( * ) Notice: Subject to any disclaimer, the term of this patent is extended or adjusted under 35 U.S.C. 154(b) by 572 days.

(21) Appl. No.: 17/609,246

(22) PCT Filed: May 7, 2020

(86) PCT No.: PCT/US2020/031890
§ 371 (c)(1),
(2) Date: Nov. 5, 2021

(87) PCT Pub. No.: WO2020/227541
PCT Pub. Date: Nov. 12, 2020

(65) Prior Publication Data
US 2022/0196582 A1    Jun. 23, 2022

Related U.S. Application Data

(60) Provisional application No. 62/977,846, filed on Feb. 18, 2020, provisional application No. 62/913,082, (Continued)

(51) Int. Cl.
*G01N 23/2258* (2018.01)
*G01N 30/02* (2006.01)
*G01N 30/72* (2006.01)

(52) U.S. Cl.
CPC ......... *G01N 23/2258* (2013.01); *G01N 30/72* (2013.01); *G01N 2030/027* (2013.01)

(58) Field of Classification Search
CPC ....... G01N 23/2258; G01N 30/72; G01N 3/28
See application file for complete search history.

(56) References Cited

U.S. PATENT DOCUMENTS

| 4,607,521 A * | 8/1986 | Saito .................. G01N 22/00 324/642 |
| 5,124,653 A | 6/1992 | Andresen et al. |

(Continued)

FOREIGN PATENT DOCUMENTS

| CA | 2461587 A1 | 4/2003 |
| CN | 107709983 A | 2/2018 |

(Continued)

OTHER PUBLICATIONS

Pullam et al., "Fourier-Transform Molecular Rotational Resonance Spectroscopy: Bridging the Gap Between Spectroscopy and Chromatography for VOC Analysis", LCGC Supplements, Special Issues—Oct. 1, 2015, vol. 33 Issue 10 p. 18-24 (Year: 2015).*

(Continued)

*Primary Examiner* — David E Smith
(74) *Attorney, Agent, or Firm* — Smith Baluch LLP

(57) ABSTRACT

The capabilities of a gas or liquid chromatography-molecular rotational resonance (GC/LC-MRR) instrument exceed those of high-resolution mass spectrometry and nuclear magnetic resonance in terms of selectivity, resolution, and compound identification. MRR detection provides high specificity for selective gas- or liquid-phase separations, (Continued)

including the ability to resolve co-eluting peaks and isomeric compounds without any loss of specificity or accuracy. MRR can perform both qualitative identification and absolute quantification of analyte components separated by GC or LC without a reference standard. GC-MRR is ideal for compound-specific isotope analysis (CSIA) and can identify enantiomers and enantiomeric excess. GC-MRR measurements are especially useful for studying biosynthetic/degradation and geochemical isotopic compounds.

25 Claims, 14 Drawing Sheets

Related U.S. Application Data filed on Oct. 9, 2019, provisional application No. 62/844,280, filed on May 7, 2019.

(56) References Cited

U.S. PATENT DOCUMENTS

| | | | | |
|---|---|---|---|---|
| 5,457,316 | A | * | 10/1995 | Cohen ............... G01N 33/0016 250/288 |
| 8,873,043 | B2 | | 10/2014 | Pate et al. |
| 9,046,462 | B2 | | 6/2015 | Pate et al. |
| 9,482,557 | B2 | | 11/2016 | Blokland et al. |
| 9,921,170 | B2 | * | 3/2018 | Pate ...................... G01J 3/453 |
| 10,107,744 | B2 | | 10/2018 | Pate et al. |
| 10,620,138 | B2 | | 4/2020 | Neill et al. |
| 2006/0066824 | A1 | | 3/2006 | Knappe et al. |
| 2013/0107244 | A1 | | 5/2013 | Doyle et al. |
| 2014/0192343 | A1 | | 7/2014 | Harrison et al. |
| 2015/0077137 | A1 | * | 3/2015 | Patterson ........... G01N 33/0016 324/637 |
| 2019/0302015 | A1 | * | 10/2019 | Pate ...................... G01N 22/00 |

FOREIGN PATENT DOCUMENTS

| | | | |
|---|---|---|---|
| CN | 112804938 | A | 5/2021 |
| IN | 201641012571 | | 11/2016 |
| JP | S5135712 | B1 | 3/1976 |
| RU | 18173 | U1 | 5/2001 |
| RU | 181173 | U1 * | 7/2018 |
| WO | 2018081243 | A1 | 5/2018 |

OTHER PUBLICATIONS

Pepich, et al. "Capillary Gas Chromatography/Pulsed Supersonic Jet/Fluorescence Excitation Spectroscopy for the Identification of Methylanthracenes in a Complex Environmental Sample", Anal. Chem. 1986, 58, 2825-2830 (Year: 1986).*
Bourne et al. "Performance characteristics of a real-time direct deposition gas chromatography/Fourier transform Infrared spectrometry system." Analytical Chemistry 62.22 (1990): 2448-2452.
International Search Report and Written Opinion in International Patent Application No. PCT/US2020/031890 mailed Oct. 19, 2020, 21 pages.
Sonstrom et al. "Chiral analysis of pantolactone with molecular rotational resonance spectroscopy." Chirality 34.1 (2022): 114-125.
Vang et al. "Copper-catalyzed transfer hydrodeuteration of Aryl Alkenes with quantitative isotopomer purity analysis by molecular rotational resonance spectroscopy." Journal of the American Chemical Society 143.20 (2021): 7707-7718.
Wahab et al. "Enhancing Sensitivity for High-Selectivity Gas Chromatography-Molecular Rotational Resonance Spectroscopy." Analytical Chemistry 93.46 (2021): 15525-15533.
Cameron et al. "Chiral Rotational Spectroscopy." arXiv preprint arXiv:1511.04615 (2015), 26 pages.
Extended European Search Report in European Application No. 20803051.0 dated Dec. 12, 2022, 10 pages.
Japanese Office Action with translation in Japanese App. No. 2021-566096 dated Feb. 21, 2024, 11 pages.
First Office Action with Search Report and translation in Chinese App. No. 202080049524.3 dated Jun. 24, 2024, 9 pages.
Second Office Action with Search Report and translation in Chinese App. No. 202080049524.3 dated Dec. 19, 2024, 11 pages.

* cited by examiner

HIGHLY SELECTIVE CHROMATOGRAPHY-MOLECULAR ROTATIONAL RESONANCE SPECTROSCOPY SYSTEMS AND METHODS

CROSS-REFERENCE TO RELATED APPLICATIONS

This application is a national stage filing under 35 U.S.C. § 371 of International Application No. PCT/US2020/031890, entitled "Highly Selective Chromatography-Molecular Rotational resonance Spectroscopy Systems and Methods." filed May 7, 2020, which claims the priority benefit, under 35 U.S.C. § 119 (e), of U.S. Application No. 62/977,846, entitled "Molecular Rotational Resonance Spectrometer for Measurement of Gas Chromatography Effluents" and filed Feb. 18, 2020; U.S. Application No. 62/913,082, entitled "A Molecular Detection/Separations System of Singular Specificity" and filed Oct. 9, 2019; and U.S. Application No. 62/844,280, entitled "Hyphenated MRR Spectroscopy: MRR Spectroscopy as a Chromatographic Detector" and filed May 7, 2019. Each of these applications is incorporated herein by reference in its respective entirety.

BACKGROUND

Chromatographic separation techniques are commonly employed in order to determine and quantify the components in chemical mixtures. Chromatography is used for both preparative and analytical purposes. In preparative chromatography, the instrument physically separates and isolates different compounds. In analytical chromatography, the instrument identifies and quantifies the different components in the sample. For example, gas chromatography (GC) is used for characterizing small-molecule mixtures in the drug development and approval process and for the measurement of impurities in pharmaceutical products. The Food and Drug Administration (FDA) relies heavily on gas chromatography for regulatory validation.

A conventional chromatography apparatus includes a column, which includes a stationary phase that retains different analytes for different amounts of time in the column based on their weights, polarities, or other properties. This allows these components to be separated. A conventional chromatography apparatus also includes a detector that returns a signal when a chemical component is eluting off the column. Some of these detectors do not obtain chemical information—for example, the flame ionization detector (FID), which returns a signal due to burning the analytes. Others do obtain chemical-specific information—for example, mass spectrometry (MS). However, for all detectors, the column should separate the individual components of the mixture completely or nearly completely in order to quantify the components reliably. Most detectors cannot accurately resolve and quantify individual components when more than one component is eluting off the column at the same time. Therefore, significant efforts are undertaken to develop new columns that can better separate challenging mixtures, and by analytical chemists to develop methods that can completely separate the individual components. Despite this extensive effort, there are certain important analyses where chromatographic separation is either impossible or very difficult (requiring expensive columns and long run times).

Molecular rotational resonance (MRR) spectroscopy, otherwise known as molecular rotational spectroscopy or microwave spectroscopy, characterizes compounds through their pure rotational angular momentum transitions in the gas phase. A molecule's rotational energy levels are quantized as stipulated by its 3-dimensional mass distribution, expressed as its moment of inertia I. This is defined (in one dimension) as $I = \Sigma m_i r_i^2$, where $m_i$ is the mass of atom i in the molecule and $r_i$ is the distance of atom i from the molecule's center of mass. The rotational spectrum of a molecule is described by a Hamiltonian that depends precisely on its moments of inertia in the three spatial axes, and so using rotational spectroscopy, molecules can be unambiguously distinguished through their differences in structure. Given its numerous and extremely narrow spectral lines (typical spectral resolution $v/\Delta v \approx 10^{-5}$), the high-resolution rotational spectrum is, therefore, absolutely unique to each molecular structure.

For example, FIG. 1 shows MRR spectra of $^{13}CH_3CN$ and $CH_3^{13}CN$, isotopomers of identical mass, in which clearly resolved spectral patterns for each can be observed. Also, notably, the MRR spectrum of each compound can be calculated with high precision. Thus, using MRR, it is possible to identify a compound unambiguously without a reference sample.

SUMMARY

An instrument that combines gas chromatography (GC) or liquid chromatography (LC) with molecular rotational resonance (MRR) spectroscopy provides an unprecedented level of molecular information on analytes in the gas or liquid phase. The resulting GC-MRR or LC-MRR spectroscopy system, also called a GC-MRR or LC-MRR instrument, can employ broadband MRR measurement techniques, including the chirped-pulse FT (CP-FT) technique, to measure spectra several orders of magnitude faster than other MRR or rotational spectroscopy systems. An inventive GC-MRR or LC-MRR instrument has at least three advantages over other GC or LC detection systems, in particular mass spectrometry (MS): (i) MRR is highly sensitive to differences in molecular structure, and so can resolve isomeric compounds of all types; (ii) MRR can resolve and quantify co-eluting compounds without a loss of specificity or accuracy; and (iii) both qualitative identification and absolute quantification can be achieved without a reference standard.

An inventive instrument may take the form of an integrated chromatography-spectroscopy system that comprises a gas chromatograph, an MRR spectrometer, and a processor, which is operably coupled to the MRR spectrometer. In operation, the gas chromatograph separates an analyte into components with a column. The column is in fluid communication with a carrier gas source that supplies a carrier gas to push the components through the column. The MRR measures a chromatogram of the components. It comprises a measurement chamber, a nozzle, and a microwave source. The measurement chamber holds the components of the analyte separated by the gas chromatograph. The nozzle, which is in fluid communication with the column and the measurement chamber, injects the components into the measurement chamber. And the microwave source, which is in electromagnetic communication with the measurement chamber, excites the components in the measurement with an excitation pulse having at least one spectral component within a frequency range of about 6 GHz to about 18 GHz. The processor resolves the components of the analyte based on the MRR spectra of the components.

An alternative instrument comprises a chromatograph and an MRR spectrometer in fluid communication with the chromatograph. The chromatograph separate an analyte into components. And the MRR spectrometer measures an MRR spectrum of at least one of the components.

Another inventive instrument comprises a gas chromatograph, an MRR spectrometer, and a pulsed-jet expansion source in fluid communication with a column of the gas chromatograph and a vacuum chamber of the MRR spectrometer. Again, the gas chromatograph separates an analyte into components, and the MRR measures MRR spectra of the components. The pulsed-jet supersonic expansion source conveys the components from the column into the vacuum chamber.

In an inventive instrument, the raw data collected by the MRR spectrometer is a series of successive time-domain free induction decay (FID) traces from analyte components separated by the chromatograph. Each of these time-domain FID traces can be Fourier-transformed to yield a corresponding molecular rotational resonance (MRR) spectrum with a processor (e.g., the instrument processor or a separate processor). The processor identifies lines in each of these MRR spectra and sums the amplitudes of the lines in each MRR spectrum to yield an amplitude value corresponding to a time bin for the time-domain FID trace. It forms a chromatogram of the analyte components based on the amplitude values and time bins for the time-domain FID traces. It also identifies a peak in the chromatogram and sums, integrates, or averages the time-domain FID traces corresponding to the time bins associated with the peak in the chromatogram to yield an integrated time-domain FID trace. Fourier-transforming the integrated time-domain FID trace yields an MRR spectrum associated with the peak in the chromatogram.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
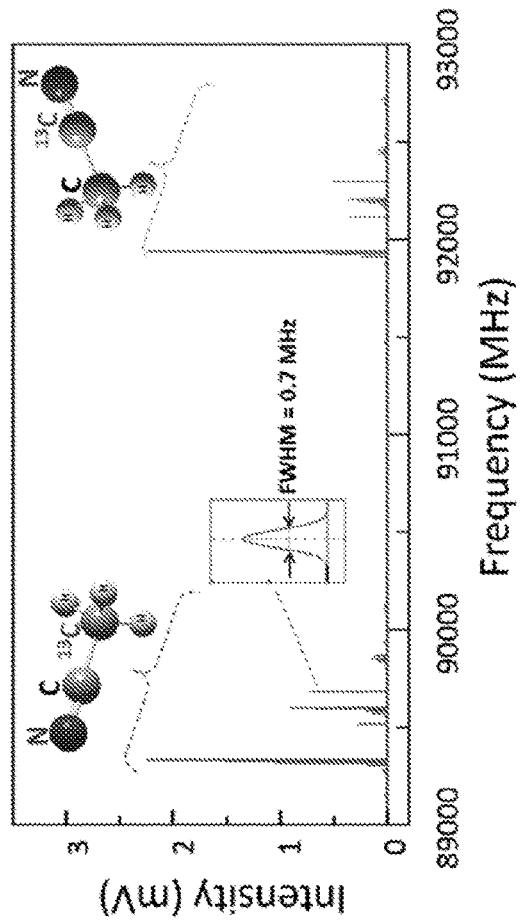
FIG. 1 shows molecular rotational resonance (MRR) spectra of two isotopomers of acetonitrile illustrating the selectivity to isobaric compounds as well as the exceedingly high resolution of MRR spectral lines.

Analytical Problems that can be Solved by GC-MRR

GC, LC, and MRR spectroscopy are well-established techniques, though MRR spectroscopy is still at an early phase in terms of commercial adoption for analytical applications. Nevertheless, GC-MRR and LC-MRR spectroscopy can solve problems that no other technique or combination of techniques can currently address. Direct MRR spectroscopy, without chromatographic separation, has been shown to identify components in mixtures containing up to about 10 components. However, real samples in biochemical, environmental, petrochemical, and other applied areas where GC and LC are used have a matrix along with numerous analytes in varying concentrations. Additionally, the MRR spectra of mixtures are highly complex, in part because the patterns of each component interleave with each other. Identifying unknown components in a mixture, which is typically done through computer-driven pattern recognition, becomes highly time-consuming when numerous species are present, ultimately limiting the ability of the analyst to interpret the complex data. Therefore, GC-MRR or LC-MRR hyphenation greatly expands the complexity of samples that can be successfully analyzed by MRR spectroscopy and enables accurate quantitation of mixture components using the areas of chromatographic peaks in the MRR chromatogram.

At the same time, MRR spectroscopy brings brand new capabilities to gas and liquid chromatographic analyses when employed as a detector. In particular, MRR spectroscopy has a particular advantage over other GC and LC detectors when chromatographic separation is impossible or difficult, because MRR spectroscopy can still readily identify and quantify individual components that cannot be separated chromatographically.

Challenges with co-elution or partial overlap of peaks is fundamental in separation science. Giddings made a bleak prediction using statistical overlap theory, stating that when using a chromatographic column with a peak capacity of n, one "has no real hope" or separating n compounds because of peak overlap. This theoretical problem has been borne out by the general resolution problem of chromatography, which states that no single column can separate all of the components in a complex mixture under given conditions. This statement especially holds true for today's far more complex separations including isomeric components. While extraordinary progress has been made on GC and LC separation of isomers, and two-dimensional separation systems (e.g., GC×GC) have also been developed to increase peak capacity, the ability of MRR spectroscopy to identify and quantify partially or completely co-eluting compounds is a significant advance for analytical chemistry.

Advanced mathematical approaches exist for resolving overlapping peaks with area extraction, such as Fourier self-deconvolution, wavelets, multivariate curve resolution, and iterative curve fitting; however, most of these chemometric techniques fail (a) when the peak is completely overlapped or (b) when experimentally measured reference spectra of each component do not exist. This is where a highly selective detector like MRR spectroscopy is very useful: MRR spectroscopy does not depend on chemometrics to resolve the co-elution. Instead, it produces a signal which is so specific to the analyte that no other molecule will match it. Additionally, MRR spectroscopy is selective enough that it can differentiate between two molecules which have an identical mass, e.g., isotopomers, diastereomers and enantiomers. This is something that even the best mass spectrometry detectors for chromatography cannot do.

Figure 2C:
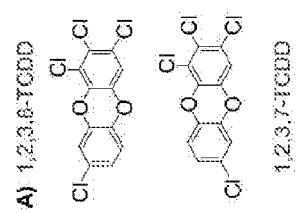
FIG. 2C shows a chromatogram of co-eluting acetonitrile isotopic species that can be analyzed by GC-MRR spectroscopy.
Figure 2B:
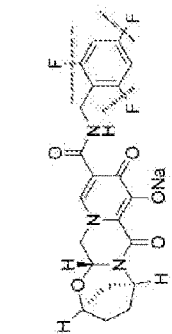
FIG. 2B shows an approved fluorinated drug and its possible des-F degradants which can be analyzed by GC-MRR spectroscopy.
Figure 2A:
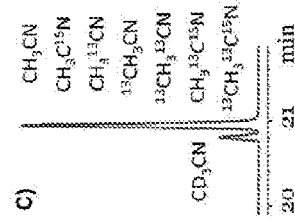
FIG. 2A shows chlorinated dioxin isomers which have never been separated by gas chromatography (GC) but can be analyzed by GC-MRR spectroscopy.

FIGS. 2A-2C highlight several examples where GC-MRR and LC-MRR can address challenging problems in separation science that cannot be solved by GC or LC alone. FIG. 2A shows two isomeric tetrachlorodibenzodioxins (TCDDs), which are persistent organic pollutants and human carcinogens. So far, no GC column can separate 1,2,3,8-TCDD and 1,2,3,7-TCDD. This analytical separation problem is exacerbated by the fact that current GC detectors produce indistinguishable signatures for these two analytes. MRR spectroscopy, however, can produce distinct spectra for these compounds.

As a second example, fluorine is gaining increasing importance in pharmaceuticals, and fluorinated compounds can be very challenging to resolve in GC from their desfluorinated counterparts. However, distinguishing these compounds by rotational spectroscopy is straightforward. FIG. 2B shows the structure of bictegravir, a recently FDA-approved drug where GC-MRR could be extremely useful in resolving fluorinated/desfluorinated impurities.

As another example, FIG. 2C shows the chromatogram of a mixture of eight isotopologues of acetonitrile ($CH_3CN$) from a demonstration of GC-MRR spectroscopy. Compound-specific isotope ratio analysis is important in a number of research areas, including metabolism and environmental degradation studies. Chromatographically, only fully deuterated acetonitrile ($CD_3CN$) can be separated from the mixture of isotopologues. A mass spectrometer could be used distinguish between isotopologues with different masses, but even the highest resolution mass spectrometer detector cannot distinguish the two $^{13}C$-substituted isotopomers, $^{13}CH_3CN$ vs. $CH_3^{13}CN$.

A GC-MRR metabolomics study (described in more detail below) shows that different bacterial cultures in groundwater can have very distinct isotopic selectivities for the same organic compounds. Additionally, the chemometric methods described above, including the powerful multivariate curve resolution method, fail in this case due to the high overlap. This study is one example of a biosynthetic and degradation investigations that can be performed with GC-MRR spectroscopy but is impossible with other methods.

GC-MRR Spectroscopy Measurement Type and Band

A GC-MRR spectroscopy system can be configured to perform targeted measurements, broadband measurements (e.g., measurements spanning several spectral lines and/or bandwidths of 50 MHz, 100 MHz, or more), or both. Targeted measurements are analogous to selected ion measurements in mass spectrometry and typically focus capturing MRR spectra of a particular species or set of species with good sensitivity. Broadband measurements are analogous to total ion monitoring measurements in mass spectrometry and are often performed to characterize mixtures or unknown compounds. In MRR spectroscopy, broadband measurements can be based on the chirped-pulse Fourier transform technique, which involves illuminating a sample with one or more pulses of chirped microwave or millimeter-wave radiation and detecting and Fourier-transforming the FID signals emitted by the sample in response to the chirped pulses. Broadband measurements are typically carried out on samples containing one or more unknown components. For more information on chirped-pulse Fourier transform MRR spectroscopy, see, e.g., the following U.S. patents, which are incorporated herein by reference in their respective entireties: U.S. Pat. No. 9,046,462, entitled "Chirped Pulsed Frequency-Domain Comb for Spectroscopy"; U.S. Pat. No. 9,921,170, entitled "Apparatus and Techniques for Fourier Transform Millimeter-Wave Spectroscopy"; and U.S. Pat. No. 10,107,744, entitled "Frequency Hopping Spread Spectrum (FHSS) Fourier Transform Spectroscopy." Broadband measurements can be performed across the entire band at once or over segments of the entire band (e.g., 2 GHz or 4 GHz segments of a 6-18 GHz band) to reduce data rates as disclosed in U.S. Pat. No. 8,873,043, entitled "Segmented Chirped-Pulse Fourier Transform Spectroscopy," which is incorporated herein by reference in its entirety.

Targeted MRR measurements are usually performed when the goal is determine whether or not the sample contains a particular compound or set of compounds. Instead of illuminating the sample to a chirped pulse, the MRR instrument illuminates the sample with one or more narrowband (e.g., single-frequency) pulses and detects the FID signal(s) emitted by the sample in response to these pulses. Because the measurement is targeted, the instrument can acquire, process, and store data more quickly than in a broadband measurement, e.g., at rate of 2 Hz, 3 Hz, 5, Hz, 10 Hz, or more. This measurement rate can be increased by performing Fourier transforms directly on a field-programmable gate array (FPGA) that acquires the data.

A targeted MRR instrument can operate without a "species recognition" capability because the excitation frequency or frequencies and targeted species are known ahead of time. A targeted MRR measurement typically involves looking at single line time versus intensity because the measured intensity is proportional to species concentration. If the targeted species and GC/LC separation parameters are known ahead of time, the MRR spectrometer may be programmed ahead of time to target different spectral lines or bands for different species. Consider quantitating a mixture of compounds A and B. If compound A comes off the column 10 seconds after the measurement has started and has a strong resonance at 10 GHz, then the MRR spectrometer may be programmed to interrogate the sample at 10 GHz at a measurement time of 10 seconds. Similarly, if compound B comes off the column 15 seconds after the measurement has started and has a strong resonance at 6.8 GHz, then the MRR spectrometer may be programmed to interrogate the sample at 6.8 GHz at a measurement time of 15 seconds. If there is an auxiliary detector at the column output, the auxiliary detector can trigger a targeted measurement based on the peak/eluate order (e.g., measure the first eluate at 7 GHz, the second eluate at 9 GHz, and so on) or based on a preliminary analysis done by the auxiliary detector (e.g., if the auxiliary detector is a mass spectrometer or other device that can provide information about the composition of the eluate).

Targeted and broadband measurements can be carried out at different frequency ranges, including bands in the microwave region (e.g., over a band from 6-18 GHz) or the millimeter-wave region (e.g., 75-110 GHz, 260-290 GHz, or 520-580 GHz). The measurement type and measurement band depend on the analyte and the desired information.

In addition, microwave MRR spectrum measurements can be more sensitive than millimeter-wave MRR spectrum measurements by virtue of differences in measurement conditions. Millimeter-wave MRR spectrum measurements are typically made using flow cells as the measurement chambers, which limits the molecular weight of the analyte components to about 120 amu. In addition, it usually takes several second for the gas to move through flow cell, degrading the temporal resolution of the GC output, which typically elutes components in less than a second. The GC carrier gas also dilutes the sample in flow cell measurements, reducing sensitivity.

As explained below, microwave MRR measurements can be made with expansion chambers fed by supersonic expansion nozzles. This enables faster measurements, preserving the temporal resolution of the GC output, and measurements of molecules with higher molecular weights as explained below. In addition, the same carrier gas that pushes the analyte components through the gas chromatograph can be used to push the sample into the expansion chamber, so the carrier gas does not cause extra dilution of the sample or degrade the measurement sensitivity.

GC-MRR Spectroscopy Systems

Figure 3A:
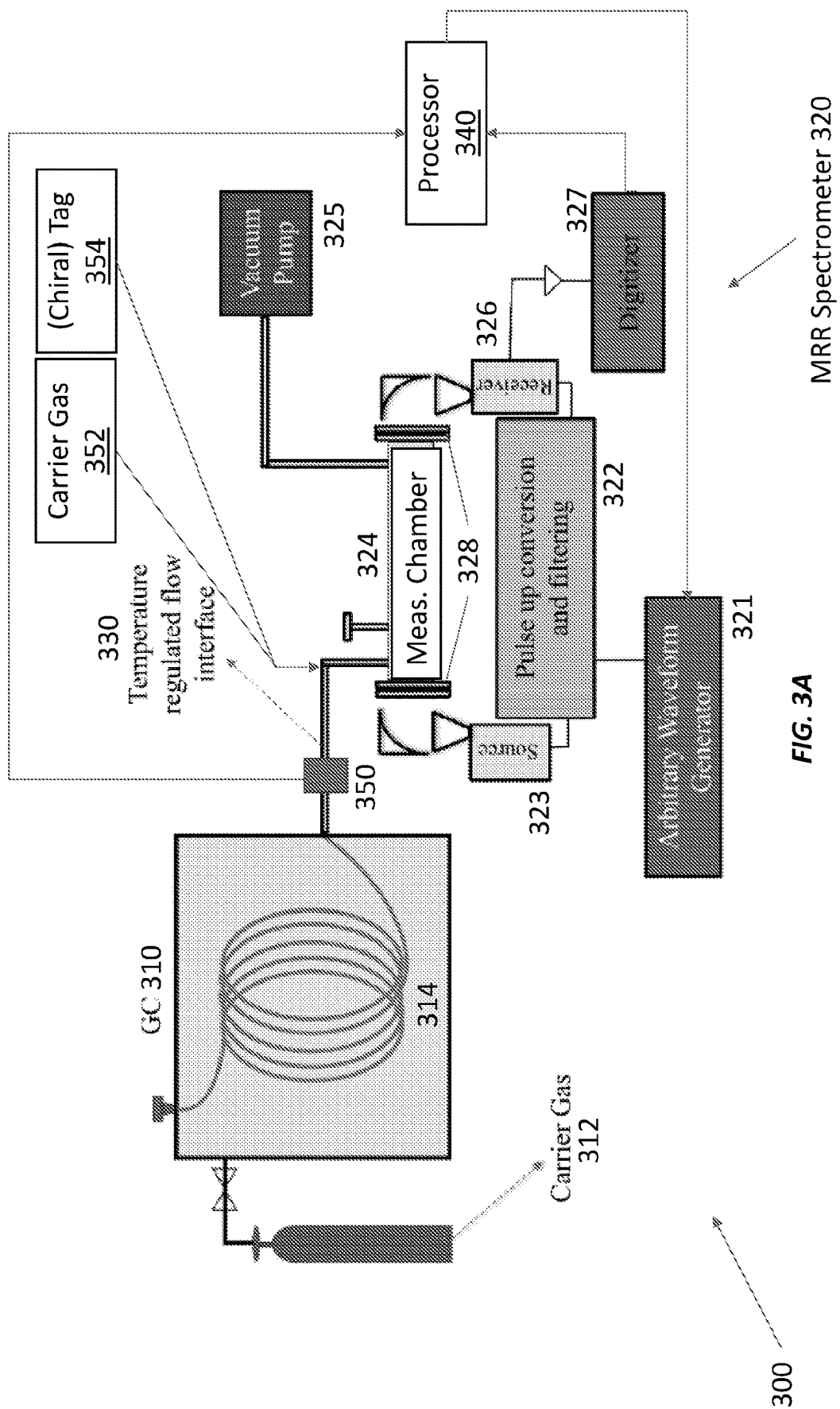
FIG. 3A is a schematic of a GC-MRR system.
Figure 3B:
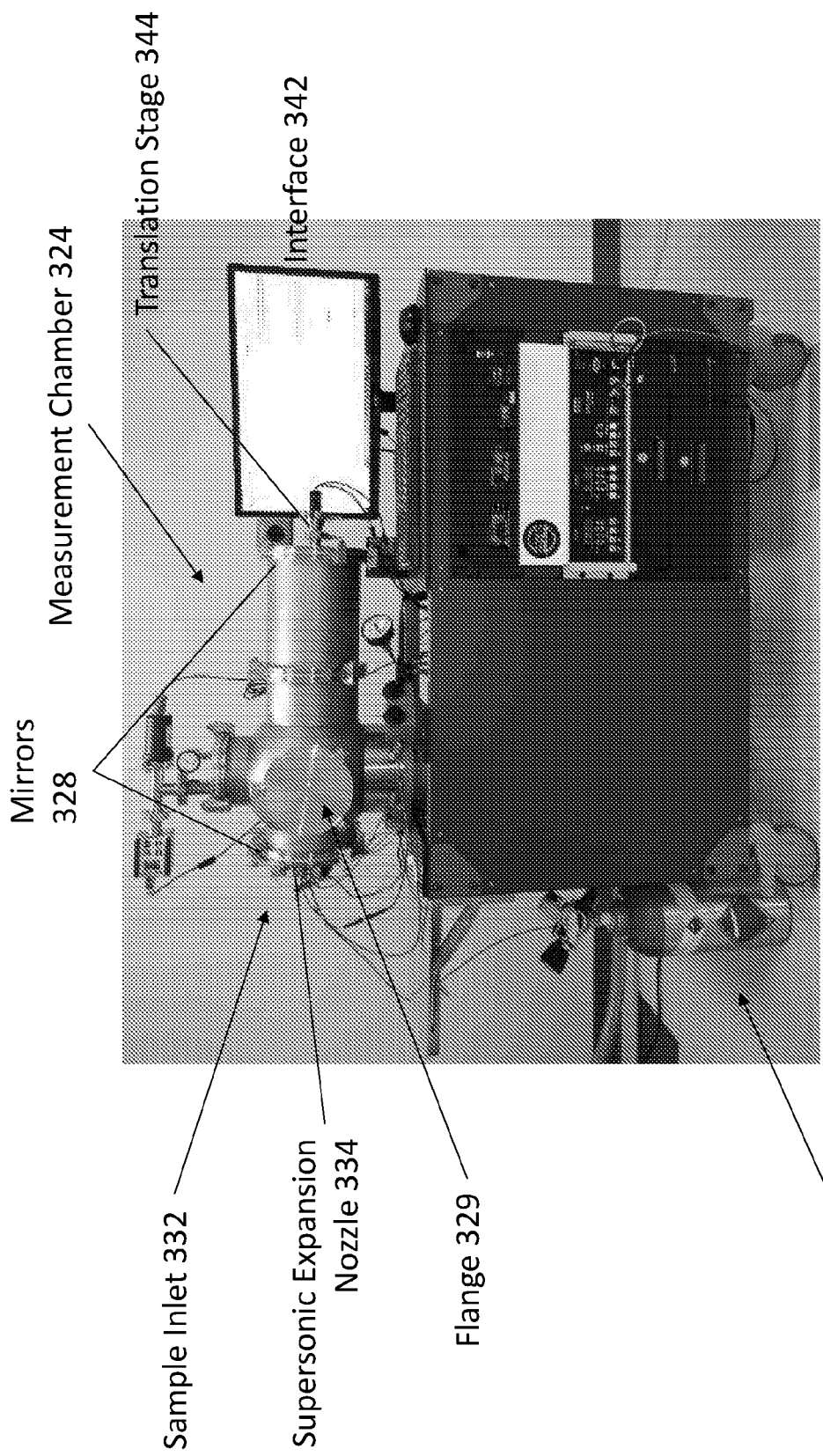
FIG. 3B is a photograph of an MRR spectrometer suitable for use in the GC-MRR system of FIG. 3A.

FIGS. 3A and 3B shows a hyphenated GC-MRR instrument 300 that can analyze difficult and/or complex mixtures in a single run. It can perform compound-specific isotope analyses (CSIA), including isotopic fractionation analysis and quantification, that cannot be done via any other method. For example, it can identify, without a reference, isomers and other compounds that cannot be separated using GC alone.

The GC-MRR instrument 300 includes a gas chromatograph 310 coupled to an MRR spectrometer 320 with a temperature-regulated flow interface 330. The gas chromatograph 310 has a carrier gas source 312 that flows a carrier gas, such as helium, hydrogen, neon, or argon, through a column 314. The carrier gas pushes an analyte, which may have many different chemical constituents, including isomers, isotopes, isotopomers, and isotopologues, through the column 314 and into the MRR spectrometer 320 via the flow interface 330. This analyte may be (periodically) siphoned off a continuous stream or flow of gas or liquid, accumulated and volatilized, if appropriate, and injected into the column 314 such that the gas chromatograph effectively samples the continuous flow, much like an analog-to-digital converter (ADC) samples an analog signal.

Some or all of the analyte's constituents propagate through the column 314 at different rates and so may appear at the end of the column 314 at different points in time. If these points in time are separated widely enough, the constituents can be resolved at the output of the column 314. Other components—isomers, for example—may co-elute, that is, they may appear at the output of the column 314 simultaneously or nearly simultaneously and so cannot be resolved using GC alone.

The carrier gas pushes the (at least partially separated) components through the interface 330 and into the MRR spectrometer's measurement chamber 324 so that the MRR spectrometer 320 can measure the components' MRR spectra. This interface 330 makes it possible to inject samples either through the GC column 314 or directly into the MRR spectrometer 320 (e.g., for pure compounds or simple mixtures where GC separation is not necessary). In other words, some samples may require GC separation whereas others may not. Samples that do not require GC separation can be injected samples directly into the MRR spectrometer (not through the GC) while other samples could be injected through the GC.

For example, the measurement chamber 324 may be a flow cell with at least one pair of holes that allow the gas-phase components and the carrier gas to enter and exit. Alternatively, a pulsed-jet expansion nozzle, a continuous-wave jet, or a buffer gas cooling cell may introduce the components into the measurement chamber 324 while simultaneously rotationally cooling them for better measurement performance as described below in greater detail. The MRR spectrometer 320 measures the MRR spectrum of each component by subjecting the component to one or more excitation pulses of microwave and/or millimeter-wave radiation. This excitation pulse is generated by a signal generator 321, such as an arbitrary waveform generator, direct digital synthesizer, or pulse pattern generator, and may be filtered, frequency-multiplied, and/or up-converted with optional circuitry 322. A source 323 applies the excitation pulse to the molecules in the measurement chamber 324.

The interface 330 can also be coupled to (in fluid communication with) a second carrier gas source 352. The second carrier gas source 352 flows a second carrier gas to the interface 330 for pushing or propelling the analyte components into the MRR spectrometer's measurement chamber 324. The first and second carrier gases can be different—for example, the first carrier gas may be helium or hydrogen, and the second carrier gas may be neon or argon as described in greater detail below.

The interface 330 can also be coupled to (in fluid communication with) and a (chiral) tag source 354. Mixing chiral tags from the chiral tag source 354 with the analyte components in a reservoir in the interface 330 causes the chiral tags to attach themselves to the different components. The chiral tags change the moments of inertia of different enantiomers among the analyte components, making it possible to resolve and quantify the enantiomers from their MRR spectra as described below. The tag source 354 may store and supply other types of tags, including polar molecules for tagging a nonpolar molecule, which has no MRR spectrum, to produce a complex that has a dipole moment and therefore can be detected by MRR.

The excited molecules emit coherent radiation in response to the excitation at their characteristic rotational frequencies via free induction decay (FID) for several microseconds. A receiver 326 detects the analog FID signal, which is digitized by an ADC 327. A processor 340 (e.g., a Field Programmable Gate Array (FPGA)) records the digitized FID signals in the time domain and Fourier-transforms to the frequency domain to produce the MRR spectra of the components. Using an MRR spectral library, the processor 340 can identify and automatically quantify individual components of the analyte based on the MRR spectra. Unassigned peaks in the MRR spectra can be further analyzed for characterization using theoretical predictions of relevant species.

Current MRR instruments measure volatilizable liquids, where the sample composition does not change significantly with time. While the pulsed-jet source in a microwave MRR instrument typically operates at a 10 Hz repetition rate, the instrument signal-averages on a single line for seconds to minutes to record a spectrum. For GC-MRR spectroscopy, on the other hand, the peak shapes are much narrower (seconds or even sub-second), so the instrument 300 records data with fine time resolution (e.g., at sampling rates of 5-10 Hz) thanks to the digitizer (ADC 327), which can achieve the desired throughput rate, and the processor 340, which can perform data handling operations without dead time.

The processor 340 may continuously measure and record the MRR spectra of eluates as they exit the GC column 314. In some cases, the processor 340 records and processes all of the MRR spectra. In other cases, the processor 340 records all of the time-domain data and Fourier-transforms only those segments corresponding to "interesting" outputs from the GC column 314 in order to conserve processing resources and reduce total processing time. The processor 340 may discard unprocessed or unexamined time-domain and/or Fourier-domain data.

Alternatively, an auxiliary (universal) detector 350, such as a thermal conductivity detector (TCD), may trigger an MRR measurement based on the output of the GC column 314. This auxiliary detector 350 can either be in-line (sample the same gas stream), as shown in FIG. 3A, or split (such as an FID or MS detector where the analytes are destroyed). When the auxiliary detector 350 detects a peak in the GC output, it sends a trigger signal to the processor 340, which in turn triggers emission of the excitation pulse(s) by the signal generator 321 and measures and analyzes the resulting FID signals. The processor 340 may also record all of the MRR data, as explained above, and discard MRR data that does not map to a chromatographic peak sensed by the auxiliary detector 350. In addition, the auxiliary detector data can be combined with the MRR data to provide a more complete analysis of the analyte, e.g., the auxiliary detector may sense components without a dipole moment while isotopic information from the MRR spectrometer 320 can complete characterization of other components.

For more on triggering MRR spectroscopy measurements, see, e.g., U.S. Pat. No. 10,620,138, entitled "Methods and Apparatus for Direct Multiplication Fourier Transform Millimeter Wave Spectroscopy," which is incorporated herein by reference in its entirety.

FIG. 3B is a photograph of a sample instantiation of the measurement chamber 324 and MRR spectrometer 320 in the GC-MRR spectroscopy system 320. This MRR spectrometer 320 is pictured as a microwave MRR spectrometer configured to make targeted measurements. In this image, a sample inlet 332 is on the left side of the measurement chamber 324. Two spherical mirrors 328 are on the left and right ports—a supersonic expansion nozzle 334 is mounted into one port, while the other is held onto the vacuum on an automatically controlled translation stage 344, which is controlled by the processor 340. The mirrors 328 make the measurement cavity 324 into a resonant Fabry-Perot cavity. The translation stage 344 tunes the length of the resonant cavity (and hence the cavity's resonant frequencies) in order to allow the measurement of targeted resonances of interest. Measuring targeted resonances increases measurement sensitivity. For broadband measurements, microwave horns (not shown) are used instead of the mirrors 328. These horns can be mounted orthogonal to the targeted mirrors 328. One horn can be attached to the flange 329 closest to the reader in FIG. 6, while the other can be attached on the opposite side (not shown). The measurement parameters, including the translation stage and excitation frequency settings, and measurement results can be shown via a display 342 that is operably coupled to the processor 340 (FIG. 3A).

Figure 3C:
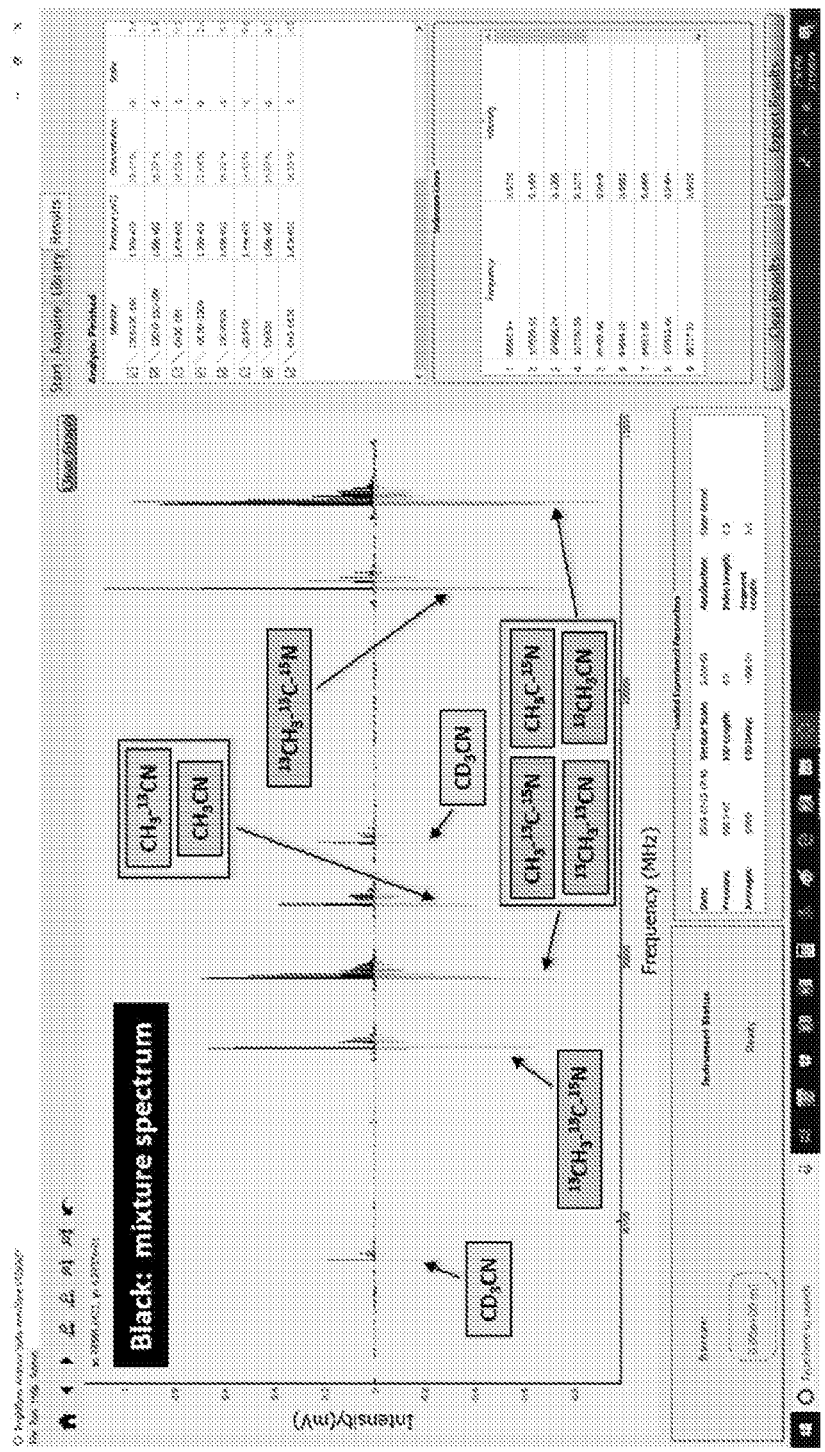
FIGS. 3C and 3D show views of a graphical user interface suitable for showing MRR spectra obtained with the GC-MRR system of FIG. 3A and/or the MRR spectrometer of FIG. 3B.
Figure 3D:
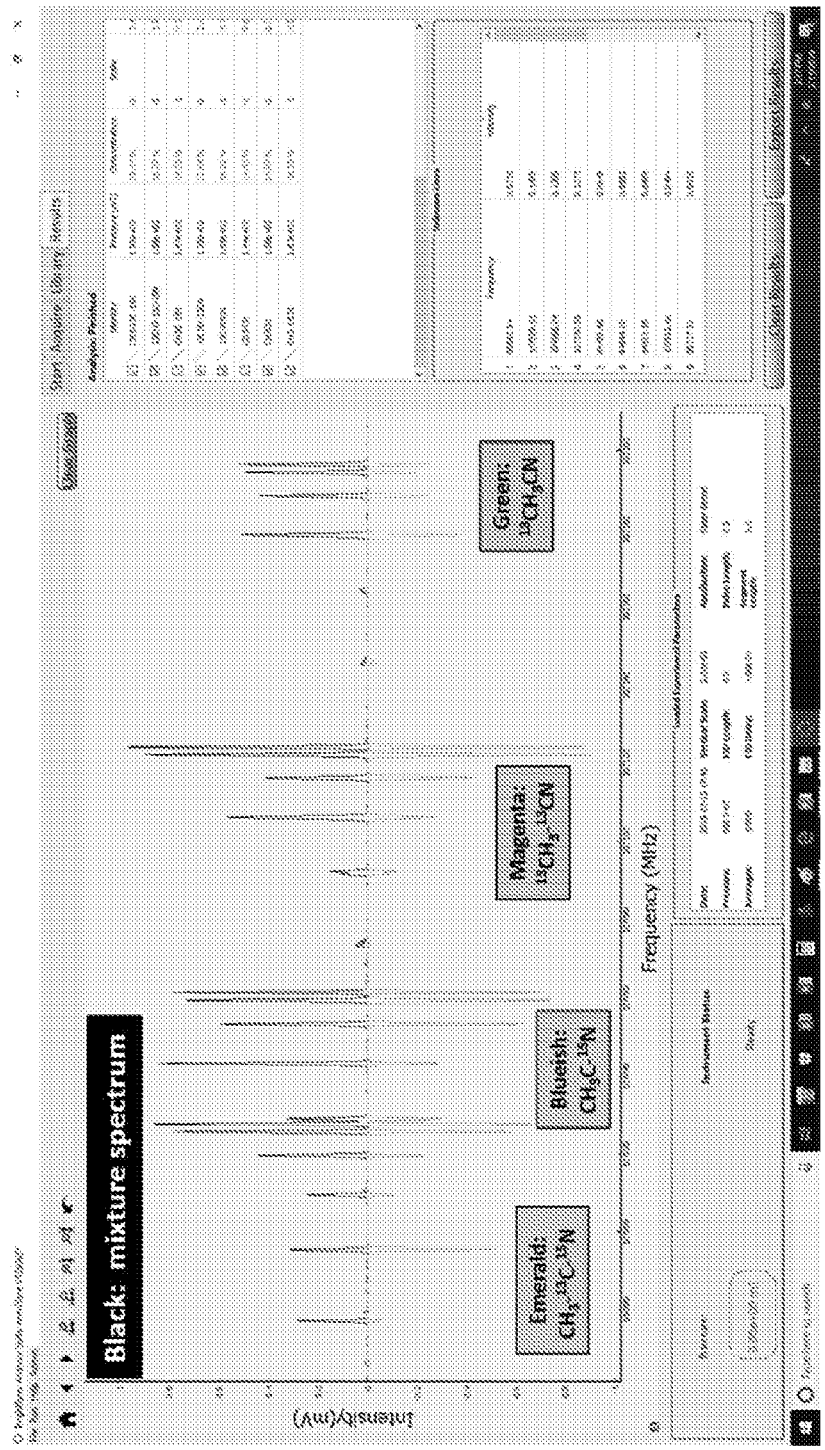

FIGS. 3C and 3D illustrate two views of a user interface that can be shown on the display 342. The view shown in FIG. 3C shows the interface displaying a broadband, millimeter-wave MRR spectrum of a mixture of eight isotopologues of acetonitrile ($CH_3CN$). Because of their similar structures, only one of the eight isotopologues ($CD_3CN$) could be separated from the others using GC. The remaining seven species come off the GC column at the same time (i.e., the other seven species are co-eluted) and are impossible to resolve using GC alone.

Because the eight acetonitrile isotopologues have distinct MRR spectra, the MRR spectrometer can resolved them even when they are coming off the column at the same time. Extracted MRR chromatograms for each isotopologue can be plotted and the peaks integrated to provide accurate concentrations for each of the species. In this example, the eight isotopologues were mixed at equal concentration, and 5 nL of this mixture was injected directly into the MRR spectrometer for analysis. The MRR spectrometer measured and saved the broadband MRR spectrum of the mixture in under 1 second. The information recorded in the MRR spectra includes both the identification of all of the isotopologues in the mixture as well as the quantity of each in the gas cell.

Molecular Weights and Rotational Cooling for GC/MRR Spectrometer Connections

One challenge with GC-MRR spectroscopy systems is the upper limit on the molecular weight of the analyte. In a GC-MRR spectroscopy system with a flow cell working at room temperature or higher, the upper limit on molecular weight may be about 150 amu, and the sensitivity at molecular weights of 100-150 amu may be limited because MRR spectra of room-temperature molecules tend to become extremely weak above 150 amu. However, using a pulsed-jet supersonic expansion source, continuous-wave jet, or a buffer gas cooling cell rotationally cools molecules for MRR analysis while also keeping them in the gas phase. A GC-MRR instrument with a pulsed-jet expansion source, continuous-wave jet, or buffer gas cooling cell can analyze molecules with higher molecular weights (e.g., up to 400 amu or higher) thanks to this rotational cooling.

Figure 4:
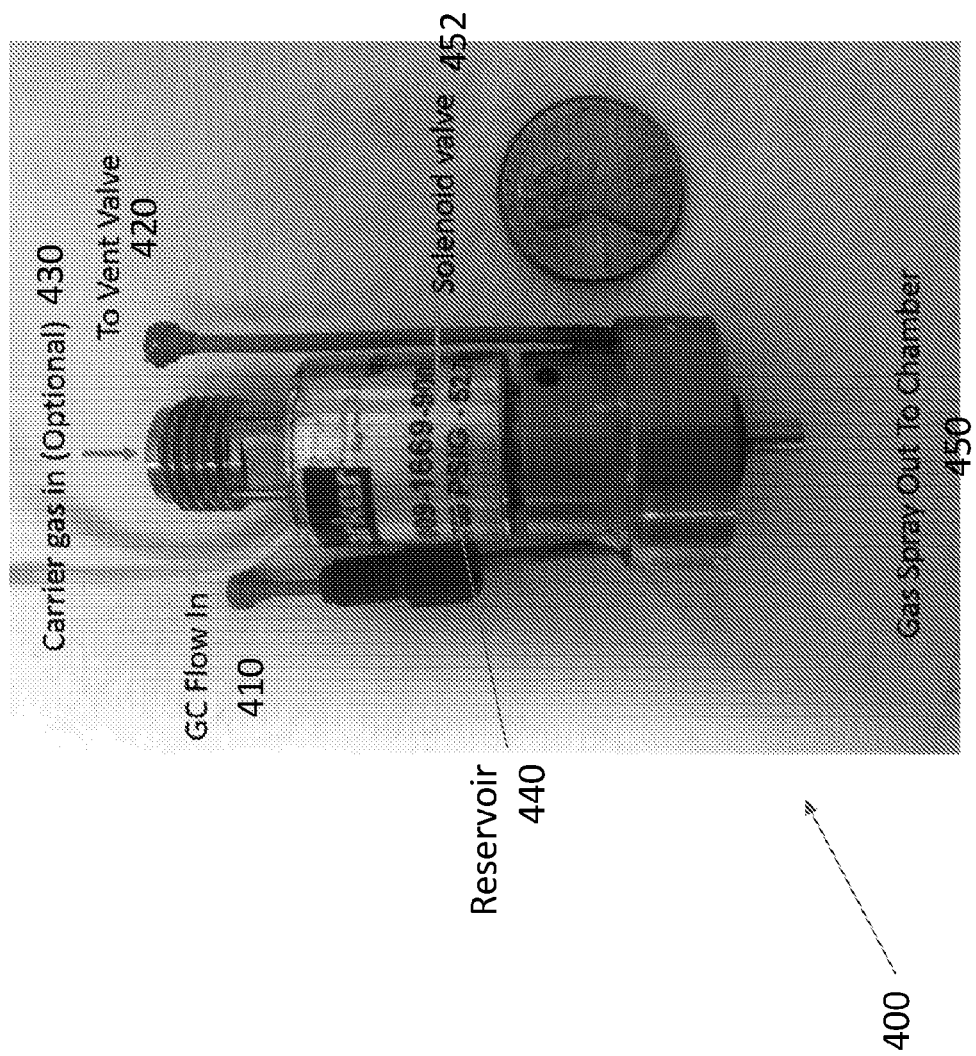
FIG. 4 shows an example of a pulsed-jet nozzle suitable for use in a GC-MRR system.

FIG. 4 shows an expanded view of a pulsed-jet supersonic nozzle 400 suitable for injecting analyte into the measurement chamber of an MRR spectrometer in a GC-MRR system such as the one shown in FIGS. 3A and 3B. There are three gas flows into the supersonic expansion nozzle: a GC flow inlet 410 for analyte components from the GC column; a vent valve inlet 430 for quickly getting rid of solvents or other volatile matrix components; and an optional inlet 430 for (additional) carrier gas. The GC flow inlet 410 and vent valve inlet 420 can be made of 1/16" tubing and can be heated to at least 300° C. to allow for direct inlet of the GC column at temperature. In FIG. 4 these tubes are PEEK plastic, but the connections could instead be made of metal(s) with better thermal properties. The central (1/4") gas connection 430 for the carrier gas is optional and can be used for a purge gas to clean samples quickly. All three gas flows combine in a reservoir 440, which can have a volume of about 500 µL or less. Reducing the reservoir volume can reduce extra-column broadening.

The combined gas flows are co-expanded with a rare carrier gas through a pinhole nozzle 450 with approximately 1 mm diameter. The pinhole nozzle 450 is opened and closed rapidly by a solenoid valve 452 sealed with a Teflon poppet. On each gas pulse (approximately 1 ms in duration), analyte component(s) travel through the pinhole 450 and into the MRR spectrometer measurement chamber, which is maintained at high vacuum (about $10^{-6}$ Torr). Along the way through the pinhole 450, the molecules undergo many collisions with the carrier gas. These collisions reduce the analyte components' rotational temperatures to approximately 1-2 K.

For example, when injecting analyte components separated by a GC column into a microwave MRR measurement chamber with a pulsed-jet supersonic nozzle, the carrier gas (e.g., neon) pressure may be set to about +2 to about +5 pounds per square inch gauge (psig). The nozzle pulses at 10 Hz. On each pulse injection, the nozzle injects about 1 nmol of analyte component(s) and 1 µmol of neon into the measurement chamber. This corresponds to approximately 10-15 mL/min (STP) of carrier gas going through the GC-MRR system. This is comparable to typical flow rates of a wide-bore GC column. Injecting neon carrier gas at the nozzle (e.g., via the optional carrier gas inlet 430 in FIG. 4) may enhance pulsed valve operation. If neon carrier gas is injected at the nozzle, then the GC column can operate with a different carrier gas, such as hydrogen or helium, since the neon would dominate the rotational cooling caused by the supersonic pulsed injection of the analyte component(s) into the microwave MRR measurement chamber. Both carrier gases can be injected into the MRR measurement chamber.

Figures 5A, 5B:
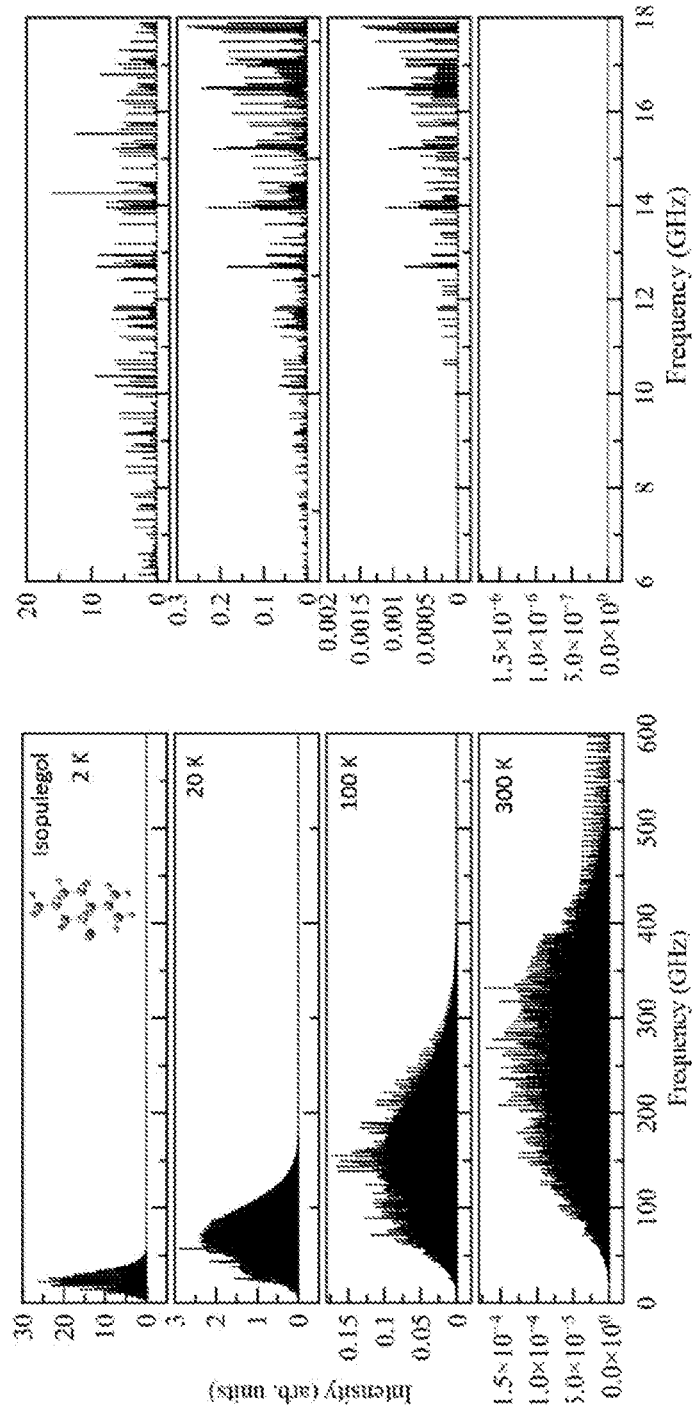
FIG. 5A shows simulated MRR spectra of isopulegol at four different temperatures, showing the increase in sensitivity and shift to lower frequency as the rotational temperature is decreased.
FIG. 5B shows closeups of the simulated MRR spectra in FIG. 5A over the frequency range 6-18 GHz. At room temperature, this molecule would be completely undetectable at microwave frequencies because the line intensities fall below the detection cutoff of $10^{-7}$ units.

FIGS. 5A and 5B show simulated MRR spectra of isopulegol (a monoterpene and menthol intermediate, mass 154 amu) at four molecular temperatures: room temperature (300 K; bottom), 100 K (lower middle), 20 K (upper middle), and 2 K (top). FIG. 5A shows the spectra over microwave and millimeter-wave frequencies of 0 to 600 GHz, and FIG. 5B shows the spectra in the microwave band of 0 to 18 GHz. These spectra show improved measurement performance at lower temperatures, which can be achieved by using a pulsed-jet supersonic expansion source to inject the GC output into the vacuum chamber of the MRR spectrometer in a GC-MRR spectroscopy system. Pulsed-jet supersonic expansion with ideal carrier gases (e.g., neon, which has excellent cooling properties) can achieve rotational temperatures between 1 K and 2 K. (One tradeoff of using supersonic expansion sources is that they have larger vacuum chambers to allow for the expansion. However, the instrument size is comparable to a high-end mass spectrometer.)

The MRR spectra in FIGS. 5A and 5B illustrate a number of effects caused by cooling the molecular rotations. First, the MRR spectra simplify dramatically. For every molecule, many fewer rotational energy levels are populated and so there are many fewer transitions. This also means that more components can be resolved in a single mixture because there are fewer lines per molecule. Second, the MRR spectra become orders of magnitude stronger (as can be seen from they axes on FIGS. 5A and 5B), which can lead to measurements that are more sensitive and/or have higher signal-to-noise ratios (SNRs). Without being bound to any particular theory, the intensity increase shown in FIGS. 5A and 5B is due to a smaller number of rovibrational states being populated. Third, the MRR spectra shift to lower frequency. The shift of spectra to lower frequency is also advantageous, because it is possible to achieve higher excitation power levels with less expensive components in the microwave region (particularly below 18 GHz, e.g., from 6-18 GHz) than in the millimeter-wave region (e.g., 75 GHz and higher). Nearly every molecule heavier than 50 amu has a spectral intensity peak in microwave range (6-18 GHz).

Figure 6:
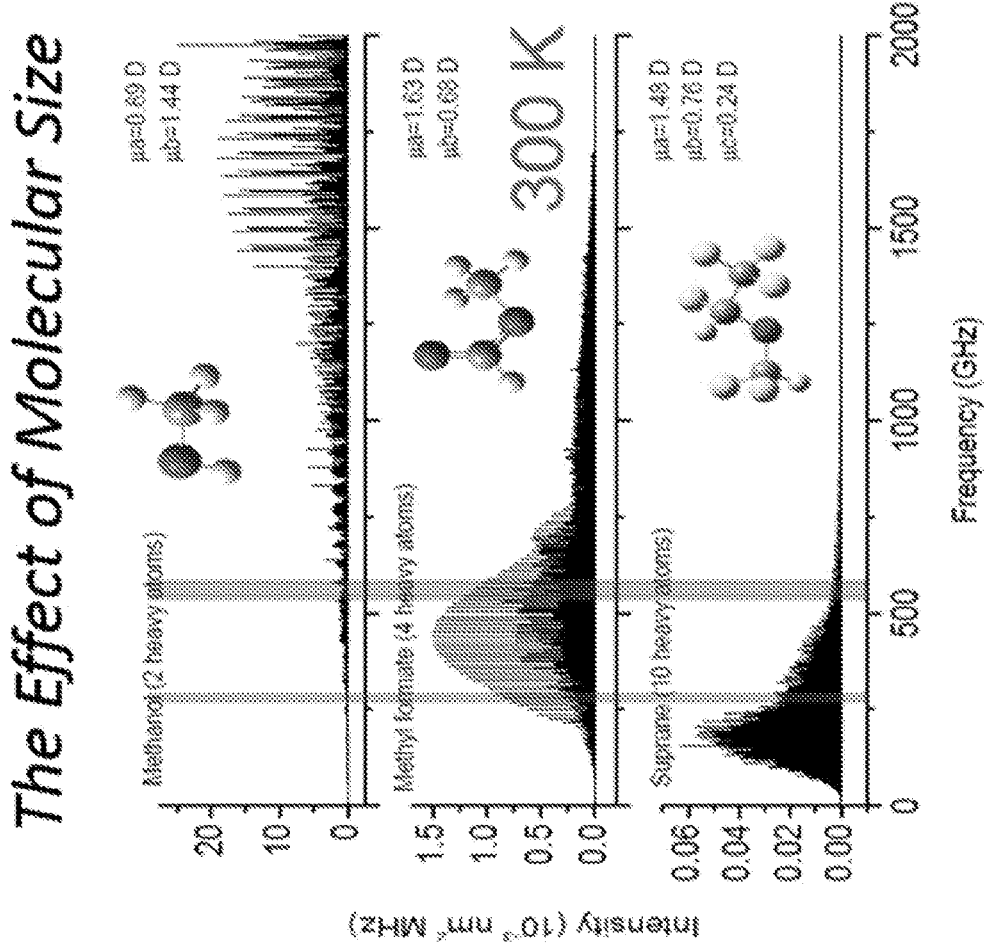
FIG. 6 shows simulated MRR spectra of molecules with different molecular weights at a temperature of 300 K.

FIG. 6 shows simulated MRR spectra of three different-sized molecules at room temperature. Generally, as molecular size increases, the MRR spectrum gets more complex because more rotational and vibrational states are populated. In the pulsed jet, vibrational states are also cooled out, so the spectra of large molecules become less complicated as indicated above. Measuring MRR spectra of compounds up to 300 amu becomes more straightforward, and beyond becomes feasible as well (with the primary limitation becoming getting the compound into the gas phase and keeping it there).

Total Molecule Chromatograms (TMCs) and Extended Molecule Chromatograms (TMCs)

Figure 7A:
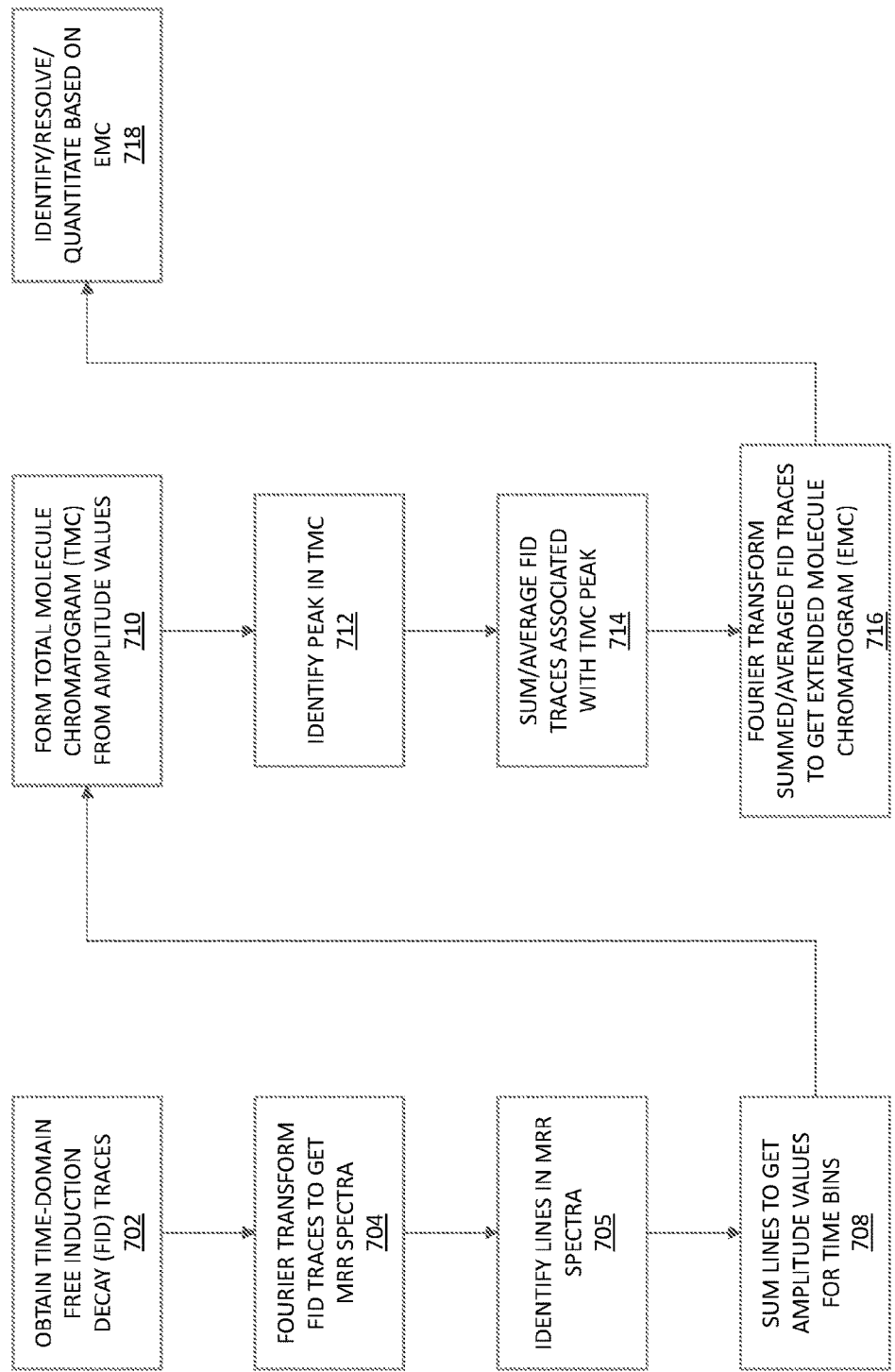
FIG. 7A illustrates a process for calculating total molecule chromatograms (TMCs) and extracted molecule chromatograms (EMCs) from raw, time-domain free induction decay (FID) traces collected by an integrated chromatography-MRR system.

FIG. 7A illustrates a method 700 for processing the raw data measured by an integrated GC-MRR instrument 300 shown in FIG. 3A (this method 700 can also be used to analyze LC-MRR data). As explained above, the GC-MRR instrument 300 obtains time-domain data (702) by injected the (at least partially) separated components from the GC column 314 into the MRR spectrometer's measurement chamber 324, then exciting the component(s) in the measurement chamber 324 with a microwave or millimeter-wave pulse and recording the resulting time-domain free induction decay (FID) signal(s). Over time, the instrument 300 records a series of these time-domain FID traces, e.g., at a rate of 5 Hz or 10 Hz.

Transforming each of these raw, time-domain FID traces yields a set of MRR spectra (704), each of which is associated with a different time bin in the measurement period. Identifying (706) and summing (708) the amplitudes of the spectral lines (peaks) in each of these MRR spectra yields an amplitude value for the time bin associated with that MRR spectrum. Plotting the amplitude values as a function of time yields a total molecule chromatogram (TMC) (710). Like other chromatogram, the TMC represents the separation of the components coming of the column in the chromatograph as a function of time, with each peak corresponding to one or more components eluting from the column at that time bin.

Each peak in the TMC may span several time bins. Identifying the peaks and associated time bins (712) makes it possible to identify the corresponding raw time-domain FID traces, which can be summed or averaged (714), then Fourier transformed to yield an MRR spectrum associated with that peak (716). This MRR spectrum is called an extracted molecule chromatogram (EMC) and can be used to identify, resolve, and/or quantitate the analyte components (718). For example, if the components are isomers that cannot be resolve from the TMC, they may be resolved by the differences in their MRR spectra in the EMC. The components can be identified by comparing the EMC to a library of previously measured EMCs (MRR spectra) and/or to theoretical EMCs.

Figure 7B:
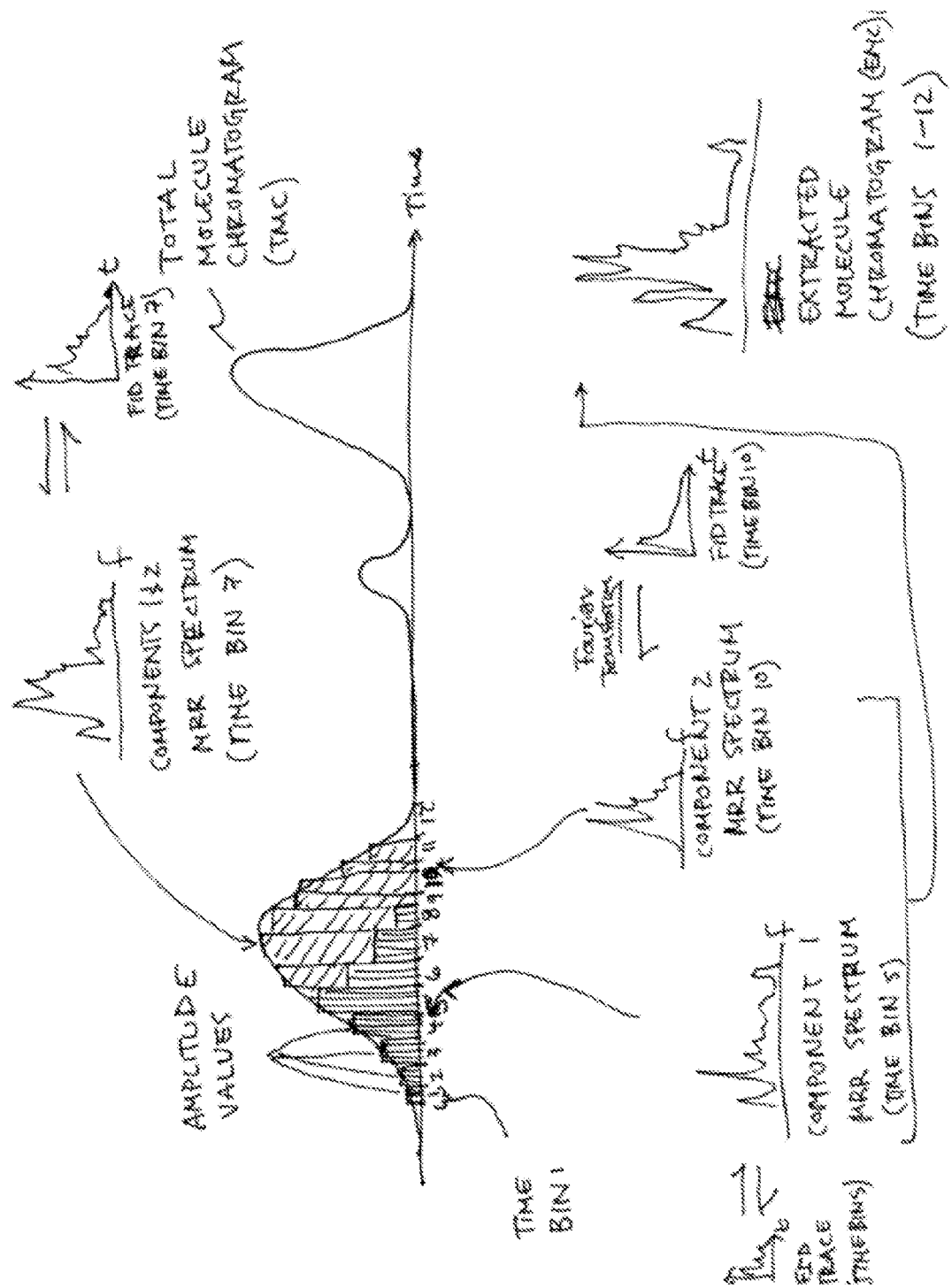
FIG. 7B is a schematic illustration of a TMC and EMCs calculated from FID traces.

FIG. 7B illustrates the relationship between FID data, a TMC, and EMCs. The TMC is plotted as a time series, with each point (amplitude value) corresponding to the sum of spectral lines in the MRR spectrum for the corresponding time bin. The MRR spectra are calculated by Fourier transforming the FID traces for the respective time bins. In some cases, multiple analyte components may contribute to a given peak. In FIG. 7B, for example, components 1 and 2 both contribute to the left-hand peak in the TMC and cannot be resolved from the peak itself. Component 1 contributes to the amplitude values of times bins 1-8, and component 2 contributes to the amplitude values of time bins 6-12. Components 1 and 2 can be resolved, identified, and quantitated from the EMC for the left-hand peak. This EMC is calculated by integrating or averaging the FID traces for time bins 1-12, then Fourier transforming the integrated or averaged FID traces.

Figure 7C:
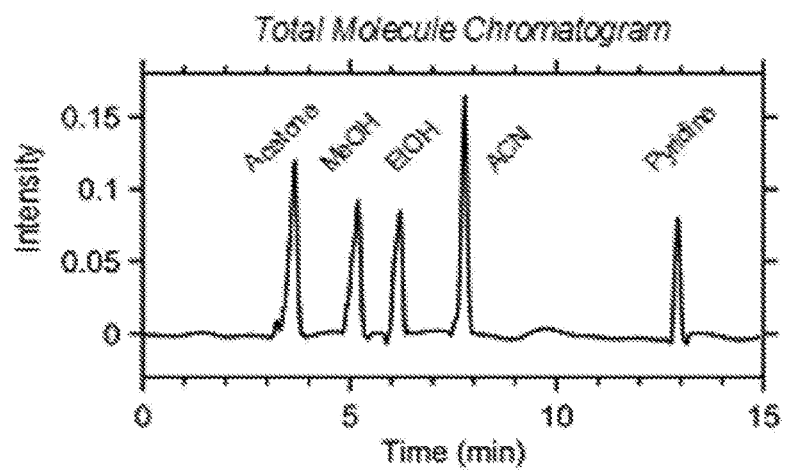
FIG. 7C is a TMC of 24 isotopologues of five common organic molecules obtained with a GC-MRR system.
Figure 7D:
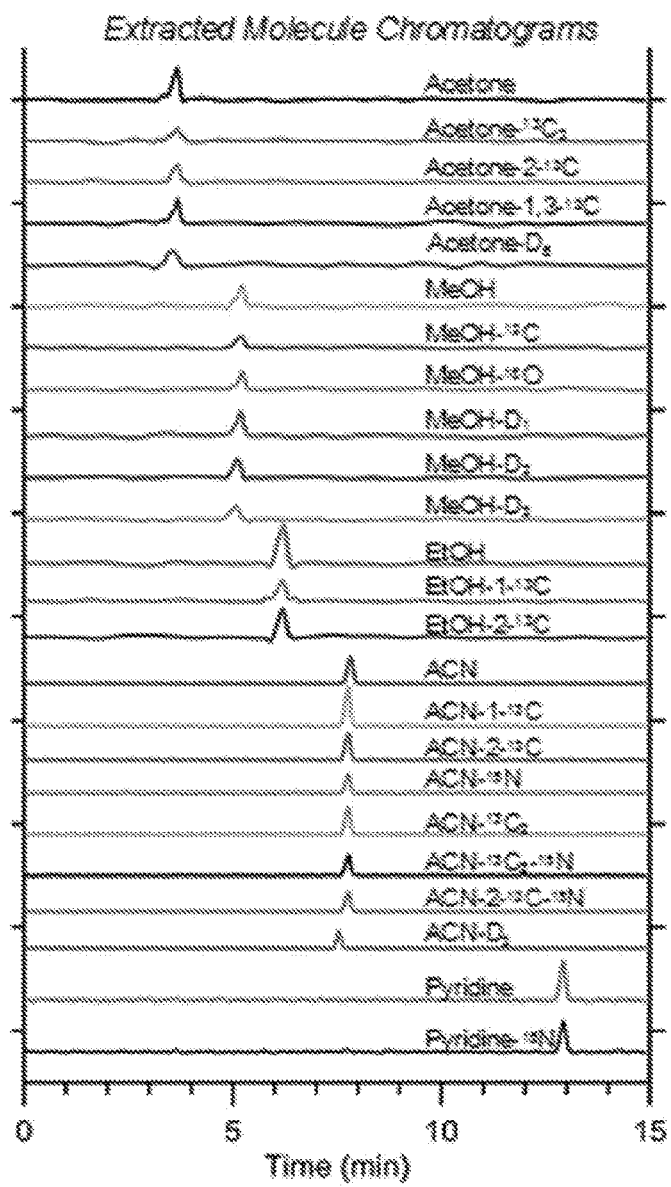
FIG. 7D shows EMCs of the 24 isotopologues in the TMC of FIG. 7A.

FIGS. 7C and 7D show a single GC-MRR analysis of 24 isotopic species of five common organic molecules that demonstrates the feasibility and utility of the GC-MRR instrument obtained using the process of FIG. 7A. FIG. 7C shows a TMC, where the peak intensities of the observed transitions are summed. The TMC indicates five dominant peaks and two small shoulders just prior to the main acetone and acetonitrile peaks (at 3.2 minutes and 7.6 minutes, respectively). These small, partially resolved shoulders are fully deuterated acetone (Acetone-d6) and triply deuterated acetonitrile (ACN-d3), which are chromatographically separated from their related isotopologues and isotopomers.

Each point in the TMC includes a broadband MRR spectrum allowing the individual contributions of the different species to be separated. The extraordinary selectivity of MRR spectroscopy allows resolution of the TMC into 24 EMCs, shown in FIG. 7D, with one EMC for each isotopically distinct compound. In each EMC trace, the transition intensities only at the frequencies of that isotopic species are summed. Isotope pattern matching/analysis is not needed for molecular identification, as the isotopes can be determined directly on their moments of inertia. Molecules that have identical masses (e.g., $H_3C-(C=O)-{}^{13}CH_3$ and $H_3{}^{13}C-(C=O)-CH_3$ or ${}^{13}CH_3CH_2OH$ and $CH_3{}^{13}CH_2OH$) can be distinguished and identified from the MRR spectra due to their different moments of inertia.

Figures 8A, 8B:
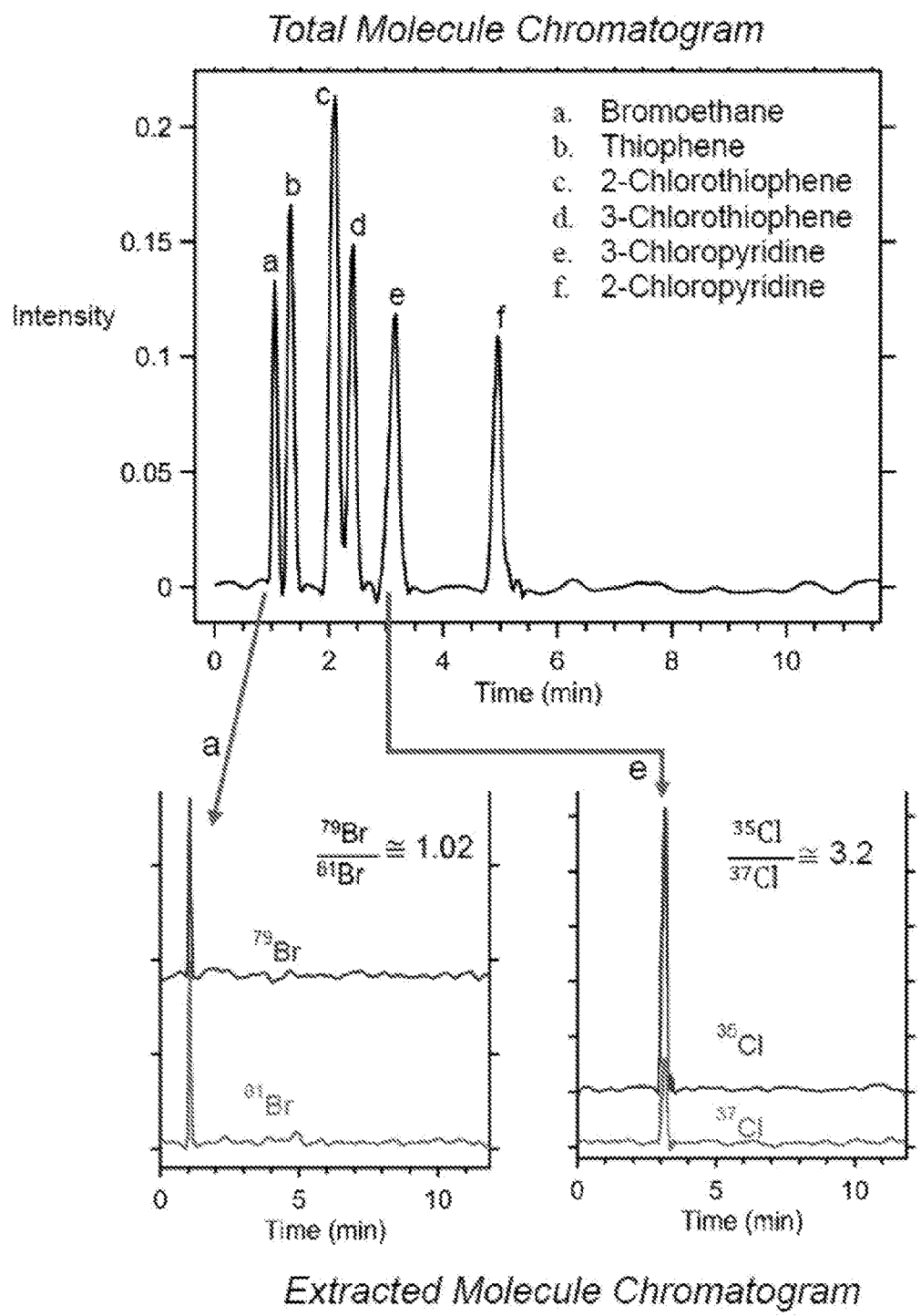
FIG. 8A shows the TMC of (a) bromoethane, (b) thiophene, (c) 2-chlorothiophene, (d) 3-chlorothiophene, (e) 3-chloropyridine and (f) 2-chloropyridine.
FIG. 8B shows two examples of how the natural isotopic abundances of the compounds in FIG. 8A are obtained easily via GC-MRR EMCs. The error in these ratios is ±3% RSD.

FIG. 8A shows the TMC, obtained by GC-MRR spectroscopy and the process in FIG. 7A, for bromoethane and five heterocyclic compounds. FIG. 8B shows isotopologue-specific EMCs showing the natural isotopic abundances for bromoethane and 2-chloropyridine. Integration of GC-MRR peak areas provide quantitative information for all species. While not used in the TMC of FIG. 8A or EMCs of FIG. 8B, changes in dipole moments and rotational constants are typically small. The ratio between MRR peak intensities also can be used directly as an accurate determination of isotopic ratios.

Unlike for mass spectrometry, isobaric compounds pose no problems. Further, peak (compound) coelution does not cause signal suppression or enhancement. This is due, in significant part, to the fact that MRR spectral detection is very high resolution and provides an abundance of lines highly specific to one compound even if that compound is an isomer or an isotopologue or isotopomer of another. Additionally, there are no suppression effects such as those that exist in mass spectrometry.

There are a number of applications where the capabilities of GC-MRR spectroscopy are highly useful. These include metabolomics, natural product screening, and environmental analysis, among others. As an example, consider the following environmental degradation study.

The determination of changes in isotope composition is used for evaluating biotic and abiotic reactions of organic feed/contaminants in ground and natural aquatic systems. Given that nearly all organic contaminants contain multiple stable isotopic species, compound-specific isotope analysis (CSIA) and position-specific isotope analysis (PSIA) offer widely applicable approaches to study the chemical reactions in complex matrices and provide a better understanding of pollutant degradation. This degradation can occur via enzymatic pathways or by photochemical or organic reactions consisting of substitution, elimination, or electron transfer.

CSIA provides a more in-depth insight into degradation pathways by pinpointing the reactive atoms in a given trace contaminant molecule. Currently, these problems are addressed by isotope-ratio mass spectrometry for carbon, hydrogen, and nitrogen but isotope-ratio mass spectrometry measurements for oxygen, sulfur, and chlorine are difficult. Similarly, PSIA examines intramolecular isotopic variations. Conventionally, PSIA (for carbon) is done via the off-line conversion of a functional group into carbon dioxide followed by GC-MS, or alternatively, site-specific natural isotope fractionation-nuclear magnetic resonance (SNIF-NMR). NMR is a time-consuming, low-sensitivity technique. Hence, significant pre-concentration of trace compounds is a requirement before NMR measurements. In contrast, GC-MRR can address these challenging cases of CSIA and PSIA without post-column conversion or purification.

An example of using GC-MRR to study environmental degradation involves the selective bio-depletion of a dilute sample of pyridine isotopologues. While the microbial metabolism of pyridines and other organic bases has been studied extensively, to the best of our knowledge, isotope specific studies do not exist. TABLE 1 shows GC-MRR results for the biodepletion of $^{14}N$ and $^{15}N$ pyridine standards in three different microbial cultures/solutions. Both pyridine isotopologues were depleted with time in these cases. The *E. coli* culture shows selective depletion of the $^{14}N$ pyridine isotopologue, while *B. cepacia* and the groundwater do not show significant differentiation. Kinetic isotope fractionation has been noted for inorganic nitrogen sources and has been used to provide insight on the biotic and enzymatic hydrolysis of herbicides.

TABLE 2 shows clearly different kinetics of biodepletion for various isotopologues of acetonitrile by two different bacteria. The data shows different kinetics of biodepletion for various isotopic isotopologues of acetonitrile by two different bacteria. The normal species of acetonitrile is depleted at the fastest rate by *E. coli*, with no detectable differentiation between three singly substituted isotopologues. Even more interesting is the fact that for *V. fischeri*, the $CH_3{}^{13}CN$ isotopologue is selectively depleted. No other analytical method or combination of methods could so easily characterize these phenomena. These types of extensive studies on position specific isotopic analysis are extremely information-rich for biodegradation studies and currently underexplored because of the lack of suitable analytical tools. GC-MRR resolves this lack.

TABLE 1

Selective microbial depletion of different isotopes of pyridine and acetonitrile as determined via GC-MRR. Errors are approximately 2.5%.

| Microbial media | Incubation Time (days)$^e$ | Isotopic compounds and relative concentrations (ppm) | |
|---|---|---|---|
| | | Pyr-$^{14}$N | Pyr-$^{15}$N |
| E. coli | 0 | 500 | 500 |
| | 7 | 280 | 320 |
| | 14 | 240 | 270 |
| B. cepacian | 0 | 500 | 500 |
| | 7 | 320 | 310 |
| | 14 | 300 | 290 |
| Groundwater | 0 | 500 | 500 |
| | 7 | 425 | 425 |
| | 14 | 415 | 415 |

TABLE 2

Selective microbial depletion of different isotopes of acetonitrile as determined via GC-MRR which is impossible by any other existing GC method for isomeric isotopologues ($^{13}$CH$_3$CN and CH$_3$$^{13}$CN).

| Microbial cultures | Incubation Time (days)$^e$ | Isotopic compounds and relative concentrations (ppm) | | | |
|---|---|---|---|---|---|
| | | CH$_3$CN | CH$_3$C$^{15}$N | $^{13}$CH$_3$CN | CH$_3$$^{13}$CN |
| E. coli | 5 | 100 | 120 | 120 | 120 |
| | 10 | 80 | 100 | 100 | 100 |
| | 20 | 70. | 90 | 90 | 90 |
| V. fischeri | 5 | 200 | 200 | 200 | 180 |
| | 10 | 190 | 190 | 190 | 160 |
| | 20 | 190 | 190 | 190 | 150 |

Liquid Chromatography (LC)-MRR Spectroscopy

Figure 9:
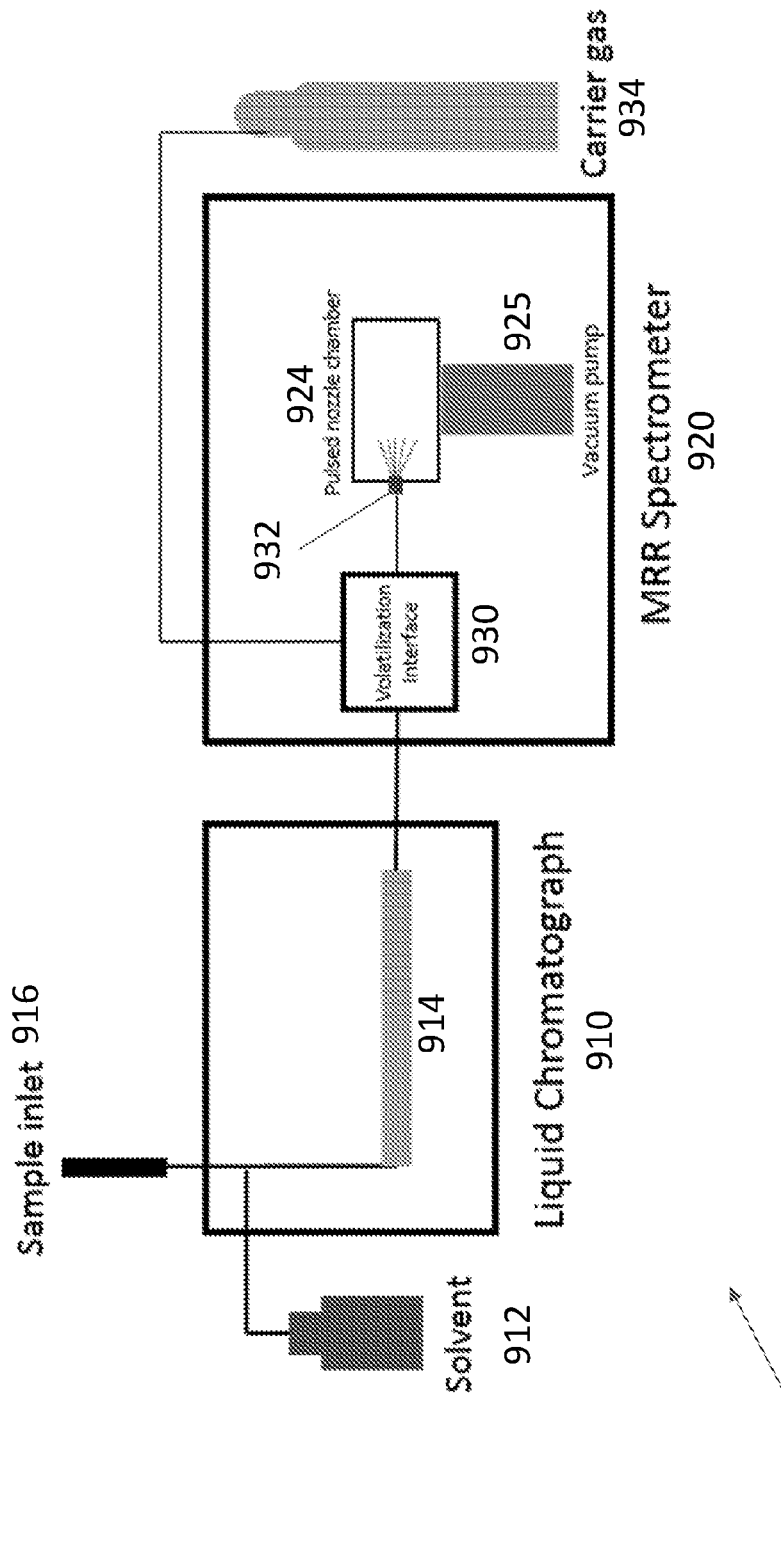
FIG. 9 shows a hybrid liquid chromatography (LC)-MRR spectroscopy system.

FIG. 9 shows a liquid chromatography (LC)-MRR spectroscopy system 900 with a liquid chromatograph 910 coupled to an MRR spectrometer 920, such as a microwave or millimeter-wave MRR spectrometer configured for broadband and/or targeted measurements. The liquid chromatograph 910 includes a column 914 that receives a liquid analyte via an inlet 916, e.g., for example from a continuously flowing sample source. A solvent flowing from a solvent source 912 pushes the liquid analyte through the column 914, where the analyte at least partially separates into its constituent components.

A volatilization interface 930 couples the at least partially separated analyte components into the MRR spectrometer 920. It volatilizes the analyte components—for example, it may heat them until they evaporate. Carrier gas, such as neon or helium, from a carrier gas source 934 pushes the volatilized analyte through the volatilization interface 930 and to a pulsed-jet supersonic nozzle 932 coupled to the volatilization interface 930. The nozzle 932 injects the volatilized analyte component(s) into the MRR spectrometer's measurement chamber 924, which is pumped down to vacuum pressure (e.g., $10^{-6}$ torr) by a vacuum pump 925. A microwave source (not shown) like the one in FIG. 3A illuminates the analyte component(s) in the measurement chamber with one or more targeted or broadband excitation pulses. A receiver (not shown) like the one in FIG. 3A detects the FID signals emitted by the volatilized analyte component(s) in response to the excitation pulse(s). Electronics (not shown) detect and process the FID signals to produce MRR spectra. The MRR spectra can be measured continuously or on-demand, e.g., in response to detection of peaks in the LC column output sensed by an auxiliary detector.

Chiral Analysis with GC-MRR Spectroscopy

Chiral analysis is an area where GC-MRR can have significant added value, particularly using a gas-phase complexation technique called chiral tagging to convert enantiomers into diastereomers in MRR for chiral analysis. A small number of small, volatile, chiral molecules have been shown to efficiently complex with a wide range of chemical analytes and allow for precise enantiomeric excess determinations of these compounds within mixtures. For more on chiral tagging, see, e.g., U.S. Pre-Grant Publication No. 2019/0302015, entitled "Cavity-Enhanced Fourier Transform Spectroscopy for Chiral Analysis," which is incorporated herein by reference in its entirety.

Figure 10A:
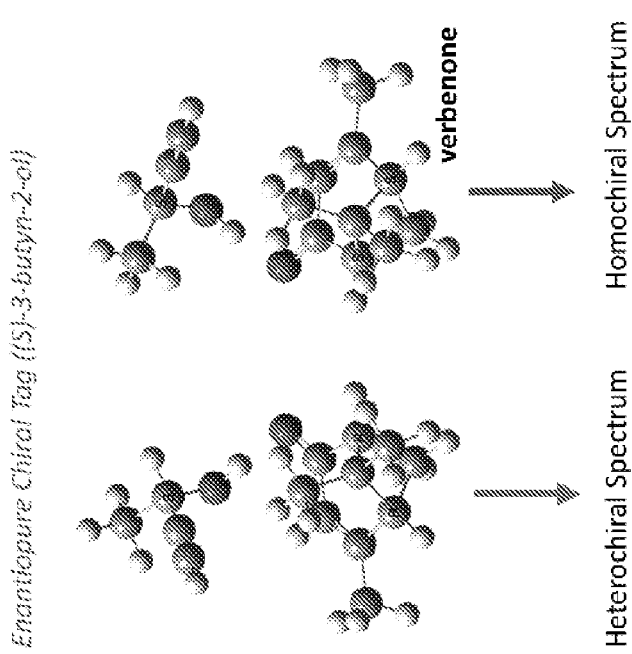
FIG. 10A illustrates chiral tagging, which is the gas phase formation of different diastereomers with distinct spectra by combining a chiral tag and enantiomers.
Figure 10B:
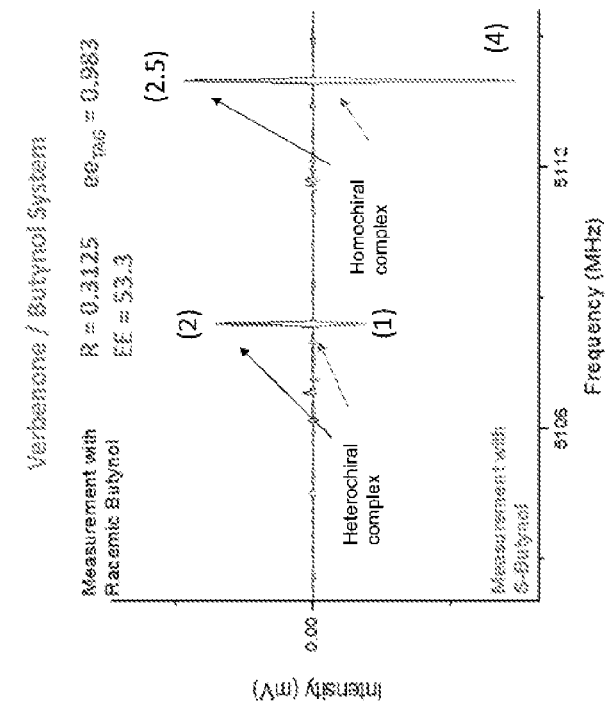
FIG. 10B illustrates enantiomeric excess analysis from MRR spectroscopy. Measurements were made with racemic or even pure enantiomer of chiral tag.

FIGS. 10A and 10B show the idea behind chiral tagging. Briefly, chiral tagging involves "tagging" analytes with a small, chiral molecule of known stereochemistry, such as the verbenone/butynol system in FIG. 10A. Weakly bound complexes, stabilized through a combination of hydrogen bonding, van der Waals, and other forces, can be formed efficiently in pulsed supersonic expansion nozzles. The resulting diastereomeric complexes have distinct moments of inertia and can be resolved through the power of MRR spectroscopy as described above and shown in FIG. 10B. Chiral analysis is important in a wide range of applications, including pharmaceuticals, environmental analysis, and metabolite analysis.

More specifically, FIG. 10A shows that enantiomers of verbenone (an example chiral molecule) have identical MRR spectra as they have the same moments of inertia. However, when a chiral tag (in this case, (S)-3-butyn-2-ol) is complexed to the two enantiomers, a difference in moment of inertia results, which produces two species with different moments of inertia and so distinct MRR spectra. The two complexes are referred to as heterochiral (i.e., (R,R)-verbenone+(S)-3-butyn-2-ol) or homochiral (i.e., (S,S)-verbenone+(S)-3-butyn-2-ol).

FIG. 10B shows two spectral lines, one of each of the heterochiral and homochiral complexes in FIG. 10A. With a racemic mixture of the butynol tag, the two complexes are seen at approximately equal intensity (they are different due to complex dipole moments, formation ratios, and other factors). With pure (S)-3-butyn-2-ol as the tag, the lines are seen at different intensities. These line ratios can be used to calculate the enantiomeric ratio and/or enantiomeric excess of verbenone in the sample.

Chiral monitoring can be integrated into an GC-MRR instrument with an accessory system for introducing a gas phase chiral tag by an additional valve at the interface of the GC outlet, prior to the pulsed jet sampling source. The tag can be mixed in with the eluting sample post-column. The spectral library may include entries for reference chiral molecules (the chiral tags). This chiral MRR method can be utilized instead of, or in conjunction with, chiral GC separation, opening up a range of new separation and identification capabilities.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system comprising:
   a chromatograph to separate an analyte into components, wherein the components include co-eluting components that cannot be separated with the chromatograph;
   a molecular rotational resonance (MRR) spectrometer, in fluid communication with the chromatograph, to measure MRR spectra of the components; and
   a processor, operably coupled to the MRR spectrometer, to resolve, based at least in part on at least one of the MRR spectra, at least one of an isomer, an isotopologue, or an isotopomer among the components of the analyte and to form a total molecular chromatogram of the analyte based at least in part on the MRR spectra of the components.

2. The system of claim 1, wherein the chromatograph is a gas chromatograph.

3. The system of claim 2, wherein the MRR spectrometer is a microwave MRR spectrometer having an expansion chamber, and further comprising:
a source of carrier gas, in fluid communication with the gas chromatograph and the expansion chamber, to push the analyte through the gas chromatograph and to push at least one of the components into the expansion chamber.

4. The system of claim 3, wherein the expansion chamber comprises a resonant cavity.

5. The system of claim 2, wherein the MRR spectrometer comprises a flow cell to receive the components of the analyte from the gas chromatograph.

6. The system of claim 1, wherein the chromatograph is a liquid chromatograph.

7. The system of claim 6, wherein the MRR spectrometer is a microwave MRR spectrometer having an expansion chamber, and further comprising:
a volatilization interface, in thermal communication with the liquid chromatograph, to volatilize the at least one of the components; and
a source of carrier gas, in fluid communication with the volatilization interface, to push the at least one of the components out of the volatilization interface and into the expansion chamber.

8. The system of claim 1, wherein the MRR spectrometer is configured to measure an MRR spectrum having a bandwidth of at least 50 MHz of at least one eluate exiting the chromatograph.

9. The system of claim 1, further comprising:
an auxiliary detector, operably coupled to the chromatograph, to detect a peak in an output of the chromatograph; and
wherein the processor is configured to trigger measurement of the MRR spectrum in response to the peak and/or to process the MRR spectrum based at least in part on the peak.

10. The system of claim 1, further comprising:
a nozzle, in fluid communication with the chromatograph and the MRR spectrometer, to rotationally cool molecules of the at least one of the components before the MRR spectrometer measures the MRR spectrum.

11. A method of analyzing an analyte, the method comprising:
separating the analyte into components with a chromatograph, wherein the components include co-eluting components that cannot be separated with the chromatograph;
measuring molecular rotational resonance (MRR) spectra of the co-eluting components with an MRR spectrometer in fluid communication with the chromatograph; and
resolving, based at least in part on the MRR spectra, the co-eluting components of the analyte.

12. The method of claim 11, wherein separating the analyte into components comprises sampling a continuous flow of the analyte with the chromatograph.

13. The method of claim 12, further comprising:
detecting a peak in an output of the chromatograph; and
triggering measurement of at least one of the MRR spectra in response to detecting the peak.

14. The method of claim 11, wherein measuring the MRR spectra comprises measuring a broadband spectrum of an eluate exiting the chromatograph.

15. The method of claim 11, further comprising:
rotationally cooling molecules of at least one of the components before measuring the MRR spectra, and
wherein measuring the MRR spectra comprises exciting at least one of the components with a microwave excitation signal.

16. The method of claim 11, further comprising:
identifying at least one unknown component of the analyte based at least in part on at least one of the MRR spectra.

17. The method of claim 11, further comprising:
quantifying at least one of the components based at least in part on at least one of the MRR spectra.

18. The method of claim 11, further comprising:
forming a total molecular chromatogram of the analyte based at least in part on the MRR spectra.

19. The method of claim 11, wherein the chromatograph is a gas chromatograph, the MRR spectrometer is a microwave MRR spectrometer having an expansion chamber, and further comprising:
pushing the analyte through the gas chromatograph into the expansion chamber with a first carrier gas; and
pushing the co-eluting components into the expansion chamber with a second carrier gas different than the first carrier gas.

20. The method of claim 11, wherein the chromatograph is a liquid chromatograph, the MRR spectrometer is a microwave MRR spectrometer having an expansion chamber, and further comprising:
volatilizing at least one of the components with a volatilization interface; and
pushing the at least one of the components out of the volatilization interface and into the expansion chamber with a carrier gas.

21. The method of claim 11, further comprising:
attaching a chiral tag to at least one of the components before measuring the corresponding MRR spectrum; and
identifying an enantiomer among the components of the analyte based on at least one of the MRR spectra and/or determining an enantiomeric excess of the components of the analyte based on at least one of the MRR spectra.

22. A system comprising:
a gas chromatograph to separate an analyte into components;
a molecular rotational resonance (MRR) spectrometer, in fluid communication with the gas chromatograph, to interrogate a first spectral line or band of a first one of the components and to interrogate a second spectral line or band different than the first spectral line or band of a second one of the components; and
a pulsed-jet supersonic expansion source, in fluid communication with a column of the gas chromatograph and a vacuum chamber of the MRR spectrometer, to convey the components from the column into the vacuum chamber.

23. The system of claim 22, wherein the pulsed-jet supersonic expansion source is configured to rotationally cool molecules of the analyte for MRR analysis by the MRR spectrometer.

24. The system of claim 22, wherein the pulsed-jet supersonic expansion source is configured to rotationally cool molecules of the analyte to a temperature of under 10 K for MRR spectrum analysis by the MRR spectrometer.

25. The system of claim 22, wherein the MRR spectrometer is configured to analyze analytes with molecular weights greater than 150 amu.

\* \* \* \* \*